(12) United States Patent
Iga

(10) Patent No.: US 10,485,081 B2
(45) Date of Patent: Nov. 19, 2019

(54) MONITORING SYSTEM, ELECTRONIC EQUIPMENT, AND MONITORING SYSTEM CONTROL METHOD

(71) Applicant: Sony Corporation, Tokyo (JP)

(72) Inventor: Hiroaki Iga, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/306,730

(22) PCT Filed: Apr. 25, 2017

(86) PCT No.: PCT/JP2017/016372
§ 371 (c)(1),
(2) Date: Dec. 3, 2018

(87) PCT Pub. No.: WO2018/020765
PCT Pub. Date: Feb. 1, 2018

(65) Prior Publication Data
US 2019/0174613 A1 Jun. 6, 2019

(30) Foreign Application Priority Data
Jul. 25, 2016 (JP) .................................. 2016-145043

(51) Int. Cl.
H05B 37/02 (2006.01)
G06F 1/26 (2006.01)

(52) U.S. Cl.
CPC ......... H05B 37/0272 (2013.01); G06F 1/263 (2013.01); H05B 37/02 (2013.01);
(Continued)

(58) Field of Classification Search
CPC ................ H05B 37/02; H05B 37/0227; H05B 37/0272; H05B 33/0842; H05B 33/0884;
(Continued)

(56) References Cited

U.S. PATENT DOCUMENTS 5,471,114 A * 11/1995 Edwards ............... H02J 7/0075
307/46
7,853,816 B2 * 12/2010 Tanaka .................. G06F 1/3209
713/322

(Continued)

FOREIGN PATENT DOCUMENTS

JP 2009-148069 A 7/2009
JP 2013-175346 A 9/2013
(Continued)

Primary Examiner — Haissa Philogene
(74) Attorney, Agent, or Firm — Michael Best & Friedrich LLP

(57) ABSTRACT

An object is to reduce influence of erroneous operation in a monitoring system provided with a sensor.
Lighting equipment is to be turned on by means of main power. A remote control device turns off the lighting equipment. A battery supplies reserve power. A sensor performs predetermined measurement by means of the main power. A detector detects whether or not supply of the main power has been stopped by operation of a predetermined switch, and generates a detection result. A communicator transmits the detection result by means of the reserve power in a case where the supply of the main power has been stopped.

10 Claims, 19 Drawing Sheets

(52) U.S. Cl.
CPC .......... *H05B 37/0227* (2013.01); *Y02B 20/42* (2013.01); *Y02B 20/44* (2013.01)

(58) Field of Classification Search
CPC .... H05B 33/0845; Y02B 20/42; Y02B 20/44; G06F 1/263; G06F 1/3209; H02J 9/061; H02J 9/065
See application file for complete search history.

(56) References Cited

U.S. PATENT DOCUMENTS

| | | | | |
|---|---|---|---|---|
| 8,362,713 | B2* | 1/2013 | Recker | H05B 33/0803 307/44 |
| 9,543,773 | B2* | 1/2017 | Momo | H02J 7/0057 |
| 9,655,189 | B2* | 5/2017 | Pederson | H05B 33/0842 |
| 2016/0216338 | A1* | 7/2016 | Shimabukuro | H02J 7/00 |

FOREIGN PATENT DOCUMENTS

| | | |
|---|---|---|
| JP | 2014-209411 A | 11/2014 |
| JP | 2015-103287 A | 6/2015 |
| JP | 2016-073631 A | 5/2016 |

\* cited by examiner

| TIME | STATE |
|---|---|
| ⋮ | ⋮ |
| 12:00 | BED |
| 12:15 | MOVING IN ROOM |
| 12:30 | FALLEN |
| 12:45 | POWER STOP |
| ⋮ | ⋮ |

| ROOM NUMBER | RESIDENT | TIME | STATE | NOTIFICATION DESTINATION TERMINAL ID |
|---|---|---|---|---|
| 301 | YAMADA | 12:00 | BED | 001 |
| 302 | SUZUKI | 12:00 | FALLEN | 001 |
| 303 | YAMADA | 12:00 | BED | 002 |
| 305 | SATO | 12:00 | POWER STOP | 002 |
| ⋮ | ⋮ | ⋮ | ⋮ | ⋮ |

DETAILED SCREEN: MR/MS. YAMADA IN ROOM NO. 306

STATE  |  FALLEN

WARNING SETTINGS
- ☑ LEAVING BED    ☐ MOVING IN ROOM    ☑ CROUCHING
- ☑ FALLEN         ☑ LEAVING ROOM      ☑ TOILET
- ☑ SENSOR ABNORMALITY    ☑ POWER STOP

WARNING HISTORY

| 22:05 | FALLEN | ON HOLD |
|---|---|---|
| 21:55 | MOVING IN ROOM | SHELVED |
| 21:43 | LEAVING BED | COMPLETED |

ACTION HISTORY

18:00
19:00
20:00
21:00

MONITORING SYSTEM, ELECTRONIC EQUIPMENT, AND MONITORING SYSTEM CONTROL METHOD

TECHNICAL FIELD

The present technology relates to a monitoring system, electronic equipment, and a monitoring system control method. Specifically, the present technology relates to a monitoring system configured to collect signals from sensors attached to lighting equipment, electronic equipment, and a monitoring system control method.

BACKGROUND ART

Typically, a monitoring system configured such that a sensor such as an acoustic sensor or an infrared sensor is arranged at each room for monitoring a status in the room and an information processing device collects signals from these sensors is used at a hospital, a nursing-care facility, etc. Unlike a security system, a sensor installation location needs to be taken into consideration to avoid stress or an uncomfortable feeling on a resident in the monitoring system used at the hospital etc. Thus, e.g., lighting equipment to which sensor-embedded electronic equipment is attached has been proposed (see, e.g., Patent Document 1). With the sensor mounted on the lighting equipment as described above, the resident less notices the presence of the sensor, and stress etc. on the resident can be reduced.

CITATION LIST

Patent Document

Patent Document 1: Japanese Patent Application Laid-Open No. 2014-209411

SUMMARY OF THE INVENTION

Problems to be Solved by the Invention

In the above-described typical technology, when a user turns off a wall switch configured to open/close a power supply path of the lighting equipment, power supply to the lighting equipment is stopped, and the sensor mounted on the equipment is stopped accordingly. Thus, for turning off the lighting equipment with the sensor being in operation, the step of pressing a lighting-off button of a remote control device as a lighting equipment accessory by the user in a state in which the wall switch is ON needs to be taken. However, the user might erroneously turn off the wall switch upon lighting off, and might accidentally stop the sensor. When the user does not notice such erroneous operation and the sensor is stopped for a long period of time, operation of the monitoring system is affected. As described above, in the above-described monitoring system, there is a problem that influence of user's erroneous operation is great.

The present technology has been created in view of the above-described situation, and is intended to reduce influence of erroneous operation in a monitoring system provided with a sensor.

Solutions to Problems

The present technology is provided to solve the above problem, and a first aspect thereof is a monitoring system including: lighting equipment to be turned on by means of main power; a remote control device configured to turn off the lighting equipment; a battery configured to supply reserve power; a sensor configured to perform predetermined measurement by means of the main power; a detector configured to detect whether or not supply of the main power has been stopped by operation of a predetermined switch, and generate a detection result; and a communicator configured to transmit the detection result by means of the reserve power in a case where the supply of the main power has been stopped, and a control method for the monitoring system. This provides an advantageous effect that the detection result is transmitted in a case where the supply of the main power to the lighting equipment to be turned off by the remote control device has been stopped by switch operation.

In addition, the first aspect may further include a selector configured to select any of the main power and the reserve power on the basis of the detection result to supply the main power or the reserve power to the communicator. This provides an advantageous effect that any of the main power and the reserve power is selected.

In addition, the first aspect may further include an auxiliary battery configured to supply auxiliary power to the selector until the main power is switched to the reserve power. This provides an advantageous effect that the auxiliary power is supplied until the main power is switched to the reserve power.

In addition, in the first aspect, the battery may be charged with the main power to supply charged power to the communicator in a case where the supply of the main power is not stopped, may supply, as the reserve power, the charged power to the communicator in a case where the supply of the main power has been stopped. This provides an advantageous effect that the charged power of the battery is supplied to the communicator even in a case where the main power is not stopped and selected.

In addition, the first aspect may further include a controller configured to lower power consumption of the sensor in a case where the supply of the main power has been stopped. This provides an advantageous effect that power consumption of the sensor is lowered when the supply of the main power is stopped.

In addition, in the first aspect, the sensor may include two sensors different from each other in power consumption, and the controller may drive one, whose power consumption is higher, of the two sensors in a case where the supply of the main power is not stopped, and drive one, whose power consumption is lower, of the two sensors in a case where the supply of the main power has been stopped. This provides an advantageous effect that one, whose power consumption is lower, of two sensors is driven in a case where the supply of the main power has been stopped.

In addition, in the first aspect, the communicator may determine, in a case where the supply of the main power has been stopped, whether or not an elapsed time from start of the supply of the main power to a current time is longer than a predetermined time, and transmit the detection result when the elapsed time is longer than the predetermined time. This provides an advantageous effect that the detection result is transmitted when the elapsed time until the current time is longer than the predetermined time.

In addition, the first aspect may further include an information terminal configured to receive and display the transmitted detection result. This provides an advantageous effect that the detection result is displayed.

In addition, a second aspect of the present technology is electronic equipment including: a battery configured to supply reserve power; a sensor configured to perform predetermined measurement by means of main power supplied to lighting equipment; a detector configured to detect whether or not supply of the main power has been stopped by operation of a predetermined switch, and generate a detection result; and a communicator configured to transmit the detection result by means of the reserve power in a case where the supply of the main power has been stopped. This provides an advantageous effect that the detection result is transmitted in a case where the supply of the main power has been stopped.

Effects of the Invention

According to the present technology, in the monitoring system provided with the sensor, an excellent advantageous effect that the influence of erroneous operation can be reduced can be provided. Note that the advantageous effects described herein are not limited, and may be any of the advantageous effects described in the present disclosure.

BRIEF DESCRIPTION OF DRAWINGS

FIG. 7 is a table of one example of data held in the multifunction unit in the first embodiment of the present technology.

FIG. 9 is a table of one example of data held in the information processing device in the first embodiment of the present technology.

FIG. 12 is a view of one example of a detailed screen displayed on the information terminal in the first embodiment of the present technology.

MODE FOR CARRYING OUT THE INVENTION

Hereinafter, modes (hereinafter referred to as "embodiments") for carrying out the present technology will be described. Description will be made in the following order:

1. First Embodiment (an example where a detection result of power stop is transmitted);
2. Second Embodiment (an example where an auxiliary battery is switched to a main battery, and a detection result of power stop is transmitted);
3. Third Embodiment (an example where a battery is constantly charged/discharged, and a detection result of power stop is transmitted);
4. Fourth Embodiment (an example where a detection result of power stop is transmitted, and a measurement interval is extended); and
5. Fifth Embodiment (an example where a detection result of power stop is transmitted, and a sensor is switched).

1. First Embodiment

[Configuration Example of Monitoring System]

Figure 1:
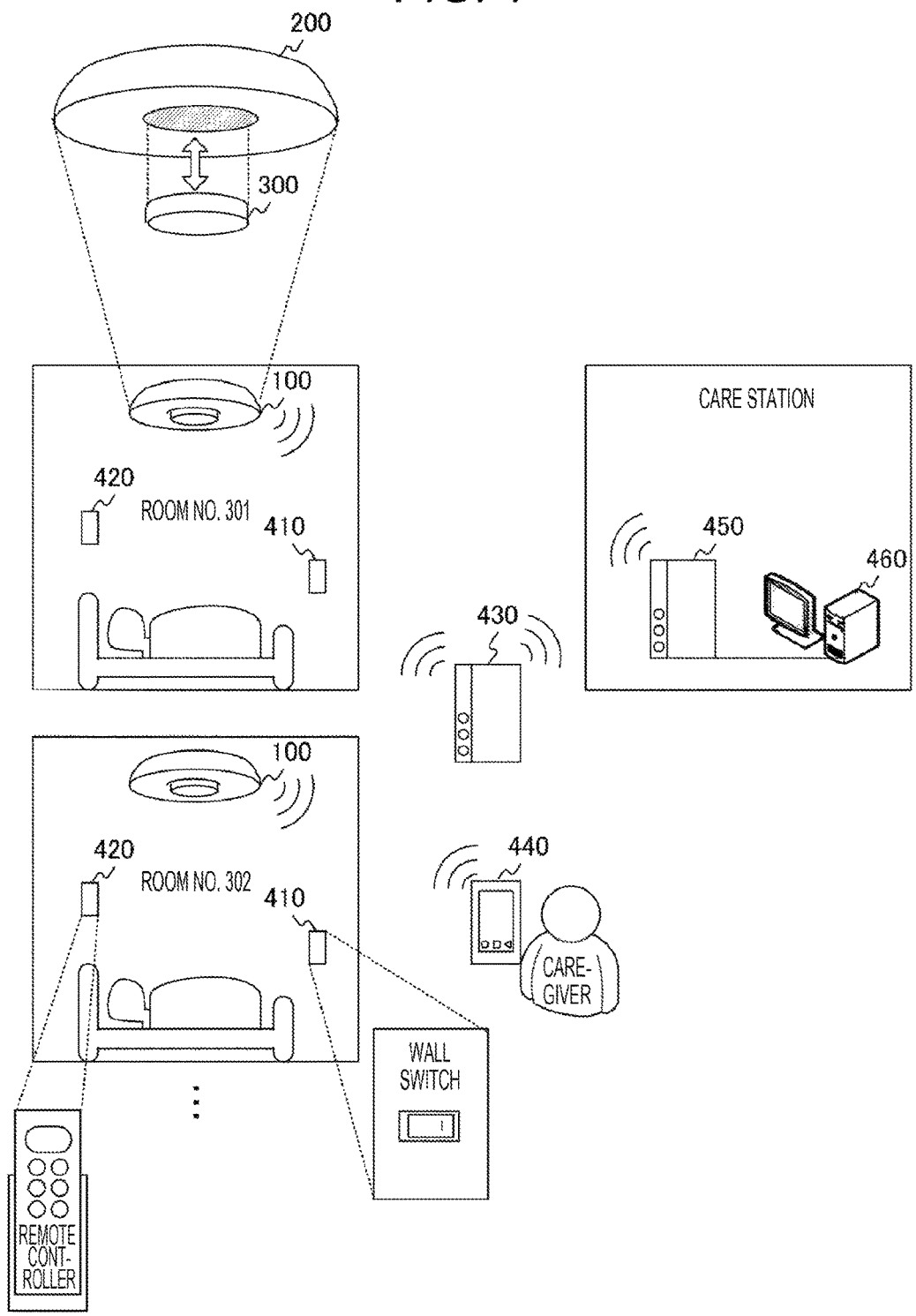
FIG. 1 is one example of an entire diagram of a monitoring system in a first embodiment of the present technology.

FIG. 1 is one example of an entire diagram of a monitoring system in a first embodiment. This monitoring system is a system configured to monitor a status for each room at a hospital, a nursing-care facility, or a home. The monitoring system includes a multifunction ceiling light 100, a wall switch 410, and a remote control device 420. Moreover, the monitoring system includes wireless local area network (LAN) repeaters 430 and 450, an information terminal 440, and an information processing device 460. In a case where there are multiple rooms at the hospital or the nursing-care facility, the multifunction ceiling light 100, the wall switch 410, and the remote control device 420 are placed at each room. Moreover, the information processing device 460 is arranged at a room for centrally controlling a resident state, such as a nurse station or a care station.

The wall switch 410 is configured to open/close a power supply path for supplying main power to the multifunction ceiling light 100. By such operation of the wall switch 410, a user can perform any of application of the main power and stop of main power supply. Note that the wall switch 410 is one example of a predetermined switch described in the claims.

The multifunction ceiling light 100 is a device placed on a ceiling of the room, and includes a ceiling light 200 and a multifunction unit 300. A recessed portion is provided at the ceiling light 200, and the multifunction unit 300 may be detachably attached to the recessed portion.

The ceiling light 200 is lighting equipment configured to be turned on by means of the main power. Moreover, the ceiling light 200 is configured to distribute the main power to the multifunction unit 300. Note that the ceiling light 200 is one example of lighting equipment described in the claims. Moreover, the multifunction unit 300 is one example of electronic equipment described in the claims.

The multifunction unit 300 is configured to measure a predetermined physical amount (e.g., a light amount or a sound volume) by means of the main power from the ceiling light 200. The multifunction unit 300 includes a built-in sensor, and performs the processing of analyzing a measurement value of the sensor to recognize particular action (falling etc.) of a resident. Moreover, the multifunction unit 300 transmits data including a recognition result to the information processing device 460 via the wireless LAN repeater 430 etc.

The remote control device 420 is configured to turn on or off the ceiling light 200 by, e.g., transmission of an infrared signal. The remote control device 420 is provided with a light-on button and a light-off button. When, e.g., the light-on button is pressed by the user, the remote control device 420 generates a light emission control signal corresponding to the button, and transmits, to the ceiling light 200, the infrared signal on which the light emission control signal is superimposed.

The wireless LAN repeaters 430 and 450 are configured to relay data exchanged among the multifunction unit 300, the information terminal 440, and the information processing device 460.

The information terminal 440 is configured to exchange data with the multifunction unit 300 or the information processing device 460 and display the data according to settings. For example, the information terminal 440 receives, from the information processing device 460, data transmitted from the multifunction unit 300 to the information processing device 460. Alternatively, the information terminal 440 directly receives data from the multifunction unit 300. A smartphone, a laptop computer, or a tablet terminal is assumed as the information terminal 440. Moreover, the information terminal 440 is carried by a staff person such as a nurse or a caregiver. Normally, each staff person often takes care of residents of multiple rooms. For this reason, the information terminal 440 of the staff person is, in advance, associated with each of the multifunction units 300 in the rooms for which such a staff person is responsible.

The information processing device 460 is configured to receive data from the multifunction unit 300, thereby performing various types of processing on the basis of such data. The information processing device 460 compiles, for example, a database of the received data, and performs data mining, machine learning, or deep learning on the basis of such data. Moreover, the information processing device 460 transfers the received data to the information terminal 440 of the staff person associated with a room as a data source.

The transferred data is displayed on a display of the information terminal 440. Upon displaying, the data is identified and displayed as necessary. For example, data with high importance for the staff person, such as data notifying that the resident has fallen, is identified and displayed by blinking, a particular color, etc. The user (the staff person etc.) can set, in advance, the type of data to be identified and displayed by operation of the information terminal 440.

Note that the multifunction unit 300 is attached to the ceiling light 200, but may be attached to other types of lighting equipment such as the ceiling light. For example, the multifunction unit 300 may be attached to, e.g., a spotlight configured to emit light with high directivity or a bracket light attached to a wall surface etc.

Moreover, the monitoring system may cooperate with a nurse call system. In this case, information transmitted from the multifunction ceiling light 100 is wirelessly transmitted to a receiving slave unit in the room. The receiving slave unit is connected to a connection plug of the nurse call system provided on a wall in the room. Moreover, a cable is wired from the connection plug to a master unit of the nurse call system arranged at the care station, and information regarding each room is aggregated to the master unit of the nurse call system. The information is transmitted from the master unit to each information terminal 400 of the caregivers.

Figure 2:
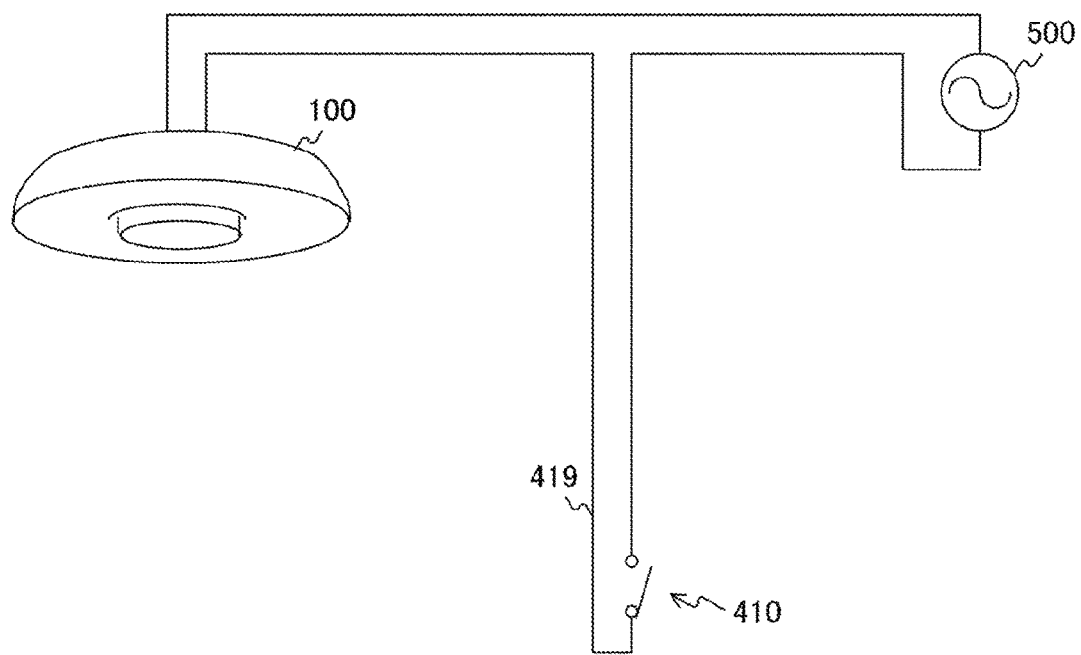
FIG. 2 is a diagram of one example of a power system in the first embodiment of the present technology.

FIG. 2 is a diagram of one example of a power system in the first embodiment. The multifunction ceiling light 100 is connected to an AC power supply 500 via a power supply line 419. Moreover, the wall switch 410 is inserted into the power supply line 419, and opens/closes the power supply line 419 according to user's operation.

[Configuration Example of Multifunction Ceiling Light]

Figure 3:
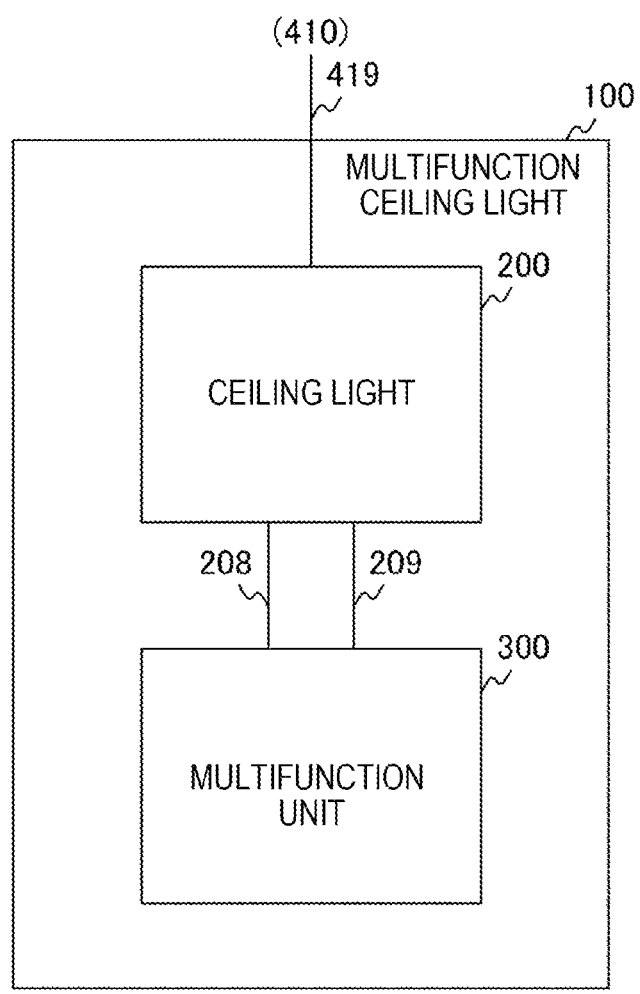
FIG. 3 is a block diagram of one configuration example of a multifunction ceiling light in the first embodiment of the present technology.

FIG. 3 is a block diagram of one configuration example of the multifunction ceiling light 100 in the first embodiment. The multifunction ceiling light 100 includes the ceiling light 200 and the multifunction unit 300. The ceiling light 200 is connected to the wall switch 410 via the power supply line 419. Moreover, the ceiling light 200 supplies the main power to the multifunction unit 300 via a power supply line 208, and exchanges data with the multifunction unit 300 via a signal line 209.

[Configuration Example of Ceiling Light]

Figure 4:
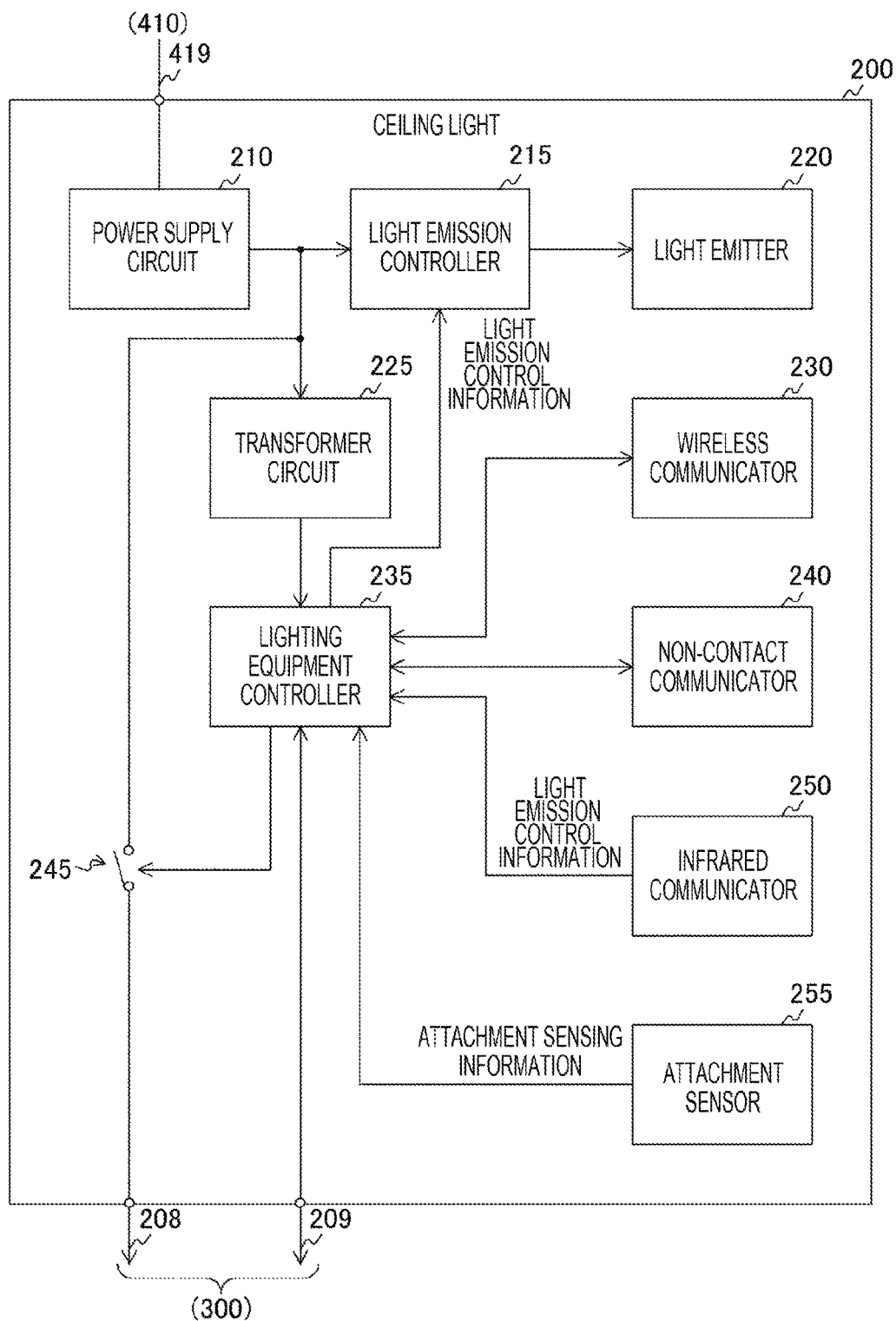
FIG. 4 is a block diagram of one configuration example of a ceiling light in the first embodiment of the present technology.

FIG. 4 is a block diagram of one configuration example of the ceiling light 200 in the first embodiment. The ceiling light 200 includes a power supply circuit 210, a light emission controller 215, a light emitter 220, a transformer circuit 225, a wireless communicator 230, a lighting equipment controller 235, a non-contact communicator 240, a switch 245, an infrared communicator 250, and an attachment sensor 255.

The power supply circuit 210 is configured to convert AC voltage of the main power into DC voltage, thereby supplying the DC voltage to each circuit in the ceiling light 200 and the multifunction unit 300. The DC voltage from the power supply circuit 210 is, for example, supplied to the light emission controller 215, the transformer circuit 225, and the switch 245.

The light emission controller 215 is configured to turn on or off the light emitter 220 according to control of the lighting equipment controller 235. The light emitter 220 is configured to be turned on or off according to control of the light emission controller 215. For example, a fluorescent light or a light emitting diode is used as the light emitter 220. In the case of using the light emitting diode, the light emission controller 215 may supply a pulse signal to the light emitting diode to adjust the light amount of the light emitting diode by the pulse width modulation (PWM) control of adjusting the pulse width of the pulse signal.

The transformer circuit 225 is configured to transform the DC voltage from the power supply circuit 210 into a predetermined level. The transformer circuit 225 supplies the transformed voltage to the lighting equipment controller 235.

The wireless communicator 230 is configured to perform wireless communication with a device such as the information terminal 440. In such wireless communication, communication standards such as Wi-Fi (registered trademark) are used. The non-contact communicator 240 is configured to perform non-contact communication with a device such as the information terminal 440. In such non-contact communication, communication standards such as Bluetooth (registered trademark) are used.

By the wireless communicator 230 or the non-contact communicator 240, data (audio data, temperature data, etc.) measured by the multifunction unit 300 or data (a measurement period, a measurement interval, etc.) for controlling the multifunction unit 300 is exchanged, for example.

The infrared communicator 250 is configured to receive the infrared signal from the remote control device 420. Light emission control information for controlling light emission operation of the light emitter 220 is superimposed on the infrared signal. The infrared communicator 250 extracts the light emission control information from the infrared signal, thereby supplying the light emission control information to the lighting equipment controller 235.

The attachment sensor 255 is configured to sense whether or not the multifunction unit 300 is attached to the ceiling light 200. The attachment sensor 255 supplies, to the lighting equipment controller 235, attachment sensing information indicating a sensing result.

The switch 245 is configured to open/close a path between the power supply circuit 210 and the power supply line 208 according to control of the lighting equipment controller 235.

The lighting equipment controller 235 is configured to control the entirety of the ceiling light 200. The lighting equipment controller 235 exchanges data with the multifunction unit 300 via the signal line 209. Moreover, the lighting equipment controller 235 transfers the light emission control information from the infrared communicator 250 to the light emission controller 215.

Further, the lighting equipment controller 235 controls the switch 245 to a closed state in the case of attaching the multifunction unit 300 to the ceiling light 200, and controls the switch 245 to an open state in the case of not attaching the multifunction unit 300 to the ceiling light 200.

With the above-described configuration, when the multifunction unit 300 is attached to the ceiling light 200, the ceiling light 200 also supplies the main power from the AC power supply 500 to the multifunction unit 300. Moreover, the ceiling light 200 is turned on or off according to the infrared signal from the remote control device 420.

Note that the wireless communicator 230 and the non-contact communicator 240 are provided, but it may be configured such that one or both of the wireless communicator 230 and the non-contact communicator 240 are not provided in a case where communication is not necessary.

[Configuration Example of Multifunction Unit]

Figure 5:
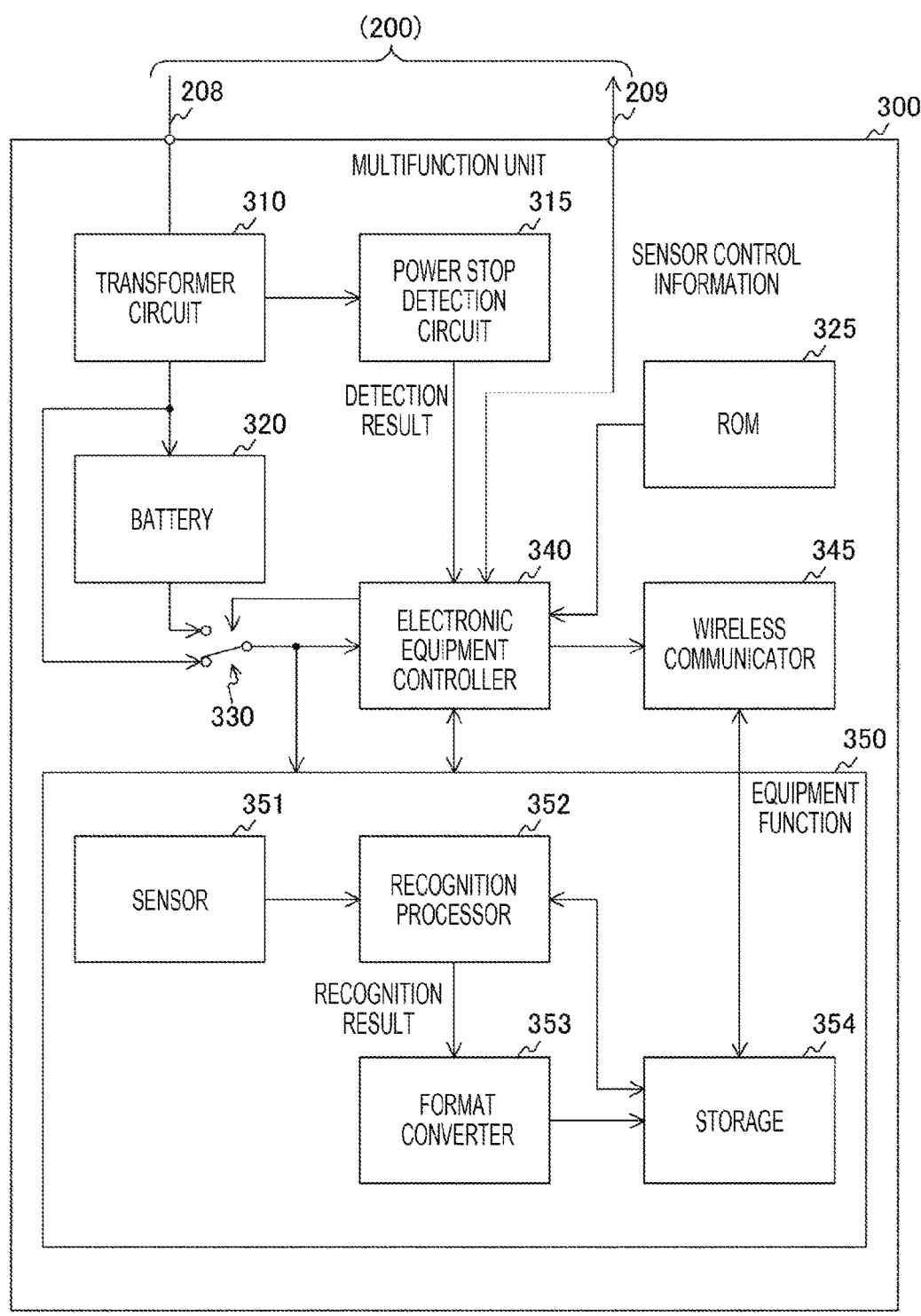
FIG. 5 is a block diagram of one configuration example of a multifunction unit in the first embodiment of the present technology.

FIG. 5 is a block diagram of one configuration example of the multifunction unit 300 in the first embodiment. The multifunction unit 300 includes a transformer circuit 310, a power stop detection circuit 315, a battery 320, a switch 330, an electronic equipment controller 340, a read only memory (ROM) 325, a wireless communicator 345, and an equipment function 350. Moreover, the equipment function 350 includes a sensor 351, a recognition processor 352, a format converter 353, and a storage 354.

A state of the multifunction unit 300 described herein includes a normal mode and a power saving mode. The normal mode is a state in which power consumption is higher than that of the power saving mode, and the power saving mode is a state in which power consumption is lower than that of the normal mode.

The transformer circuit 310 is configured to convert DC voltage from the ceiling light 200 into a predetermined level. The transformer circuit 310 supplies the converted voltage (the main power) to the battery 320 and the switch 330.

The power stop detection circuit 315 is configured to detect whether or not the main power supply has been stopped. The power stop detection circuit 315 detects, for example, stop of the main power supply in a case where the voltage of the main power reaches equal to or lower than a predetermined threshold. The power stop detection circuit 315 supplies a detection result to the electronic equipment controller 340. Note that the power stop detection circuit 315 is one example of a detector described in the claims.

The battery 320 is configured to supply reserve power. The battery 320 is charged with the main power, and outputs, as the reserve power, the charged power to the switch 330 when the main power supply is stopped.

The switch 330 is configured to select any of the main power from the transformer circuit 310 and the reserve power from the battery 320 according to control of the electronic equipment controller 340. The switch 330 supplies the selected power to the electronic equipment controller 340 and the equipment function 350. Note that the switch 330 is one example of a selector described in the claims.

The ROM 325 is configured to store a predetermined program to be executed by the electronic equipment controller 340.

The wireless communicator 345 is configured to perform wireless communication with the information processing device 460 via the wireless LAN repeater 430 etc. The wireless communicator 345 stores received data in the storage 354. Moreover, the wireless communicator 345 reads, as necessary, data from the storage 354 upon data transmission. Information (the measurement interval, the measurement period, etc.) for controlling the sensor 351 and recognition parameters are transmitted from the information processing device 460 to the wireless communicator 345. The recognition parameters will be described later. Moreover, the recognition result, measurement data, measurement date and time, notification of main power stop, a main power stop time, etc. are transmitted from the wireless communicator 345 to the information processing device 460. Note that the wireless communicator 345 is one example of a communicator described in the claims.

The electronic equipment controller 340 is configured to control the entirety of the multifunction unit 300. The electronic equipment controller 340 causes the multifunction unit 300 to transition to the normal mode when the main power is applied. In the normal mode, the electronic equipment controller 340 controls the switch 330 to drive the wireless communicator 345 and the equipment function 350 by an enable signal.

On the other hand, when the main power supply is stopped, the electronic equipment controller 340 controls the switch 330 to select the reserve power from the battery 320. Moreover, the electronic equipment controller 340 controls the wireless communicator 345 to transmit a detection result indicating power stop and a power stop time to the information processing device 460 together. Further, the electronic equipment controller 340 saves data in processing in the storage 354 or the information processing device 460, as necessary. The saved data is recovered upon subsequent transition to the normal mode. In addition, the electronic equipment controller 340 causes the multifunction unit 300 to transition from the normal mode to the power saving mode.

In the power saving mode, the electronic equipment controller 340 supplies the enable signal set to disable to the equipment function 350 to stop the equipment function 350. Moreover, the electronic equipment controller 340 also supplies the enable signal set to disable to the wireless communicator 345 to stop the wireless communicator 345. In addition, the electronic equipment controller 340 stops, as necessary, an unnecessary circuit or program.

The sensor 351 is configured to measure the predetermined physical amount by means of the main power from the switch 330. The sensor 351 acquires the measurement data at regular measurement intervals to supply the measurement data to the recognition processor 352. The sensor 351 includes, for example, an infrared sensor, an optical sensor, a temperature sensor, a humidity sensor, an acoustic sensor, and an image sensor. Note that not a single type of sensor but two or more types of sensors may be provided at the equipment function 350.

The recognition processor 352 is configured to analyze the measurement data from the sensor 351 to execute the recognition processing of recognizing whether or not action of the resident corresponds to the particular action. When receiving the measurement data from the sensor 351, the recognition processor 352 acquires a measurement time to store the measurement data and the measurement time in association with each other in the storage 354. Moreover, the recognition processor 352 reads the measurement data and the recognition parameters used for the recognition processing from the storage 354 to execute the recognition processing. The recognition processor 352 obtains, for example, the degree of correlation between a waveform pattern of the measurement data (the audio data) from the acoustic sensor and a waveform pattern upon falling in the recognition processing. Then, when the degree of correlation is higher than a predetermined threshold, the recognition processor 352 recognizes that the resident has fallen. In this recognition processing, the waveform pattern upon falling and the threshold are used as the recognition parameters, for example. Moreover, the recognition processor 352 supplies, as the recognition result, a recognition processing result to the format converter 353. Further, upon power stop, the recognition processor 352 saves the recognition processing parameters and the recognition processing result right before power stop.

Note that the recognition processor 352 may perform the recognition processing by means of the measurement data from other sensors than the acoustic sensor. For example, the recognition processor 352 may regularly acquire image data from the image sensor. In this case, the recognition processor 352 uses, e.g., a background difference method for obtaining a difference between a captured image and a predetermined background image to extract a moving body portion from the image. Using, e.g., machine learning or deep learning, falling etc. can be recognized for the extracted moving body portion. In the background difference method, a threshold to be compared with a difference value and the background image are used as the recognition parameters.

Moreover, although the entirety of the recognition processing is executed by the multifunction unit 300, it may be configured such that part or the entirety of the recognition processing is performed outside (e.g., the information processing device 460). In the case of performing the processing outside, the recognition processor 352 may acquire the measurement time when receiving the measurement data from the sensor 351, and may store, in the storage 354, the measurement data or the data obtained by execution of partial processing and the measurement time in association with each other. Alternatively, the recognition processor 352 may execute the recognition processing in every measurement of the sensor 351, or may execute the recognition processing at intervals longer than the measurement interval of the sensor 351.

The format converter 353 is configured to convert a recognition result format into a predetermined format used by the information processing device 460. The format converter 353 stores the format-converted recognition result in the storage 354.

With the above-described configuration, when the main power is applied, the multifunction unit 300 performs measurement using the sensor 351, and transmits the recognition processing result to the information processing device 460. In the case of the configuration for performing the recognition processing by the information processing device 460, the multifunction unit 300 transmits the measurement data to the information processing device 460. Then, when the main power supply is stopped, the multifunction unit 300 notifies the information processing device 460 of power stop, and stops the sensor 351 etc.

When the wall switch 410 is turned off as described above, the main power supply is stopped, and the sensor 351 is stopped accordingly. In the monitoring system, the sensor 351 is preferably constantly in operation. Thus, upon lighting off, the user needs to follow the step of pressing the light-off button of the remote control device 420 with the wall switch 410 being kept on.

However, when the lighting equipment such as the ceiling light 100 is turned off, the operation of turning off the wall switch 410 is general operation. For this reason, the user might erroneously turn off the wall switch 410 upon lighting off, and might accidentally stop the sensor 351.

A comparison example where the battery 320 is not provided at the multifunction unit 300 is assumed herein. In this comparison example, when the main power supply is stopped by operation of the wall switch 410, the wireless communicator 345 is also immediately stopped, and notification of power stop can be no longer provided. Thus, there is a probability that the user does not notice erroneous operation and the sensor 351 is stopped for a long period of time.

On the other hand, in the configuration in which the battery 320 is provided, the wireless communicator 345 can provide notification of power stop by means of the reserve power of the battery 320. Such notification is transferred to the information terminal 440 carried by the user, and therefore, the user can notice erroneous operation to promptly turn on the wall switch 410 and resume the power supply. Thus, influence of the erroneous operation can be reduced.

Figure 6:
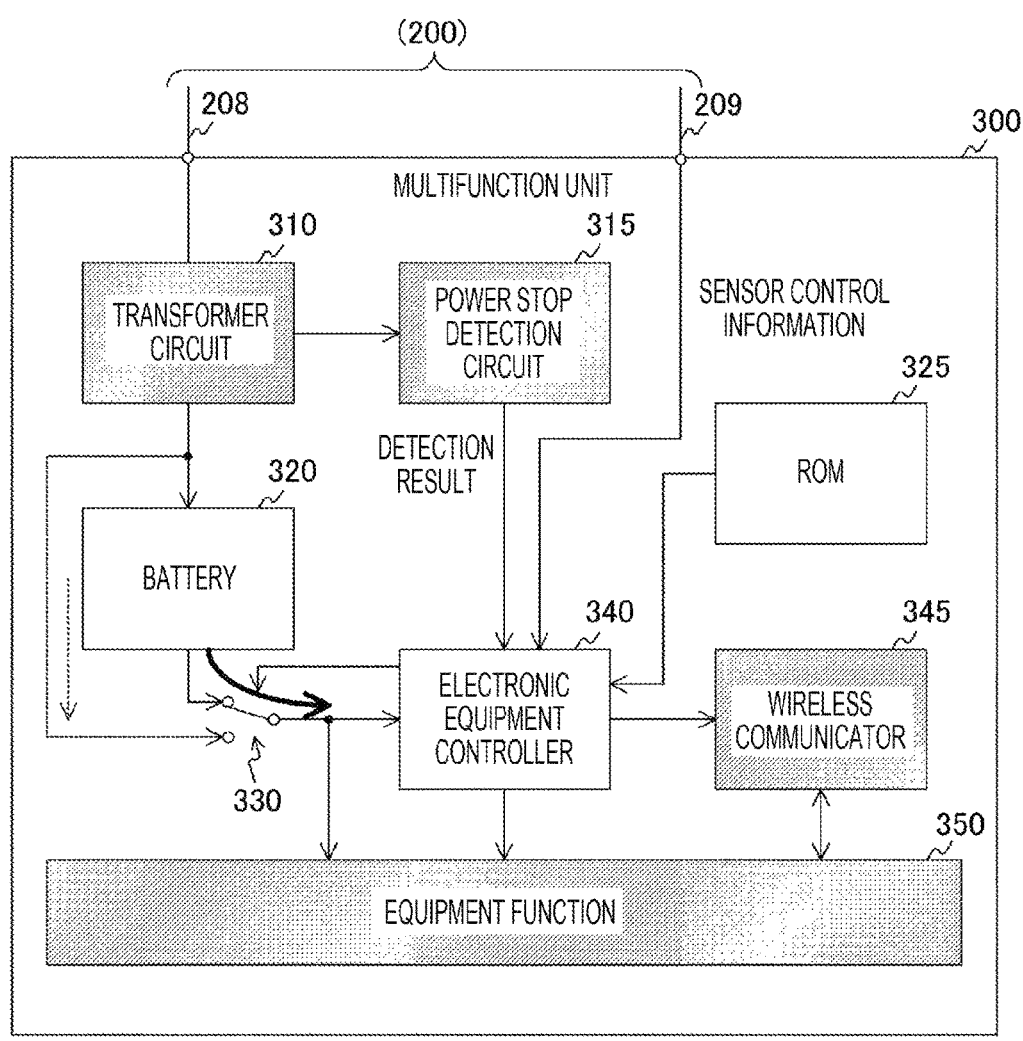
FIG. 6 is a block diagram of one example of a state of the multifunction unit in a power saving mode in the first embodiment of the present technology.

FIG. 6 is a block diagram of one example of the state of the multifunction unit 300 in the power saving mode in the first embodiment. In this figure, shaded portions indicate stopped circuits. Upon transition to the power saving mode, the electronic equipment controller 340 stops the equipment function 350 and the wireless communicator 345. Moreover, the transformer circuit 310 and the power stop detection circuit 315 are also stopped. On the other hand, operation of the electronic equipment controller 340 etc. can be continued by the reserve power from the battery 320.

FIG. 7 is a table of one example of data held in the multifunction unit 300 in the first embodiment. Suppose that the multifunction unit 300 recognizes that the resident was sleeping on a bed at 12:00 and was moving in the room at 12:15. In this case, the multifunction unit 300 holds the state of "BED" in association with the time of "12:00", and holds the state of "MOVING IN ROOM" in association with the time of "12:15".

Moreover, suppose that the multifunction unit 300 recognizes that the resident has fallen at 12:30 and stop of the main power supply has been detected at 12:45. In this case, the multifunction unit 300 holds the state of "FALLEN" in association with the time of "12:30", and holds the state of "POWER STOP" in association with the time of "12:45".

[Configuration Example of Information Processing Device]

Figure 8:
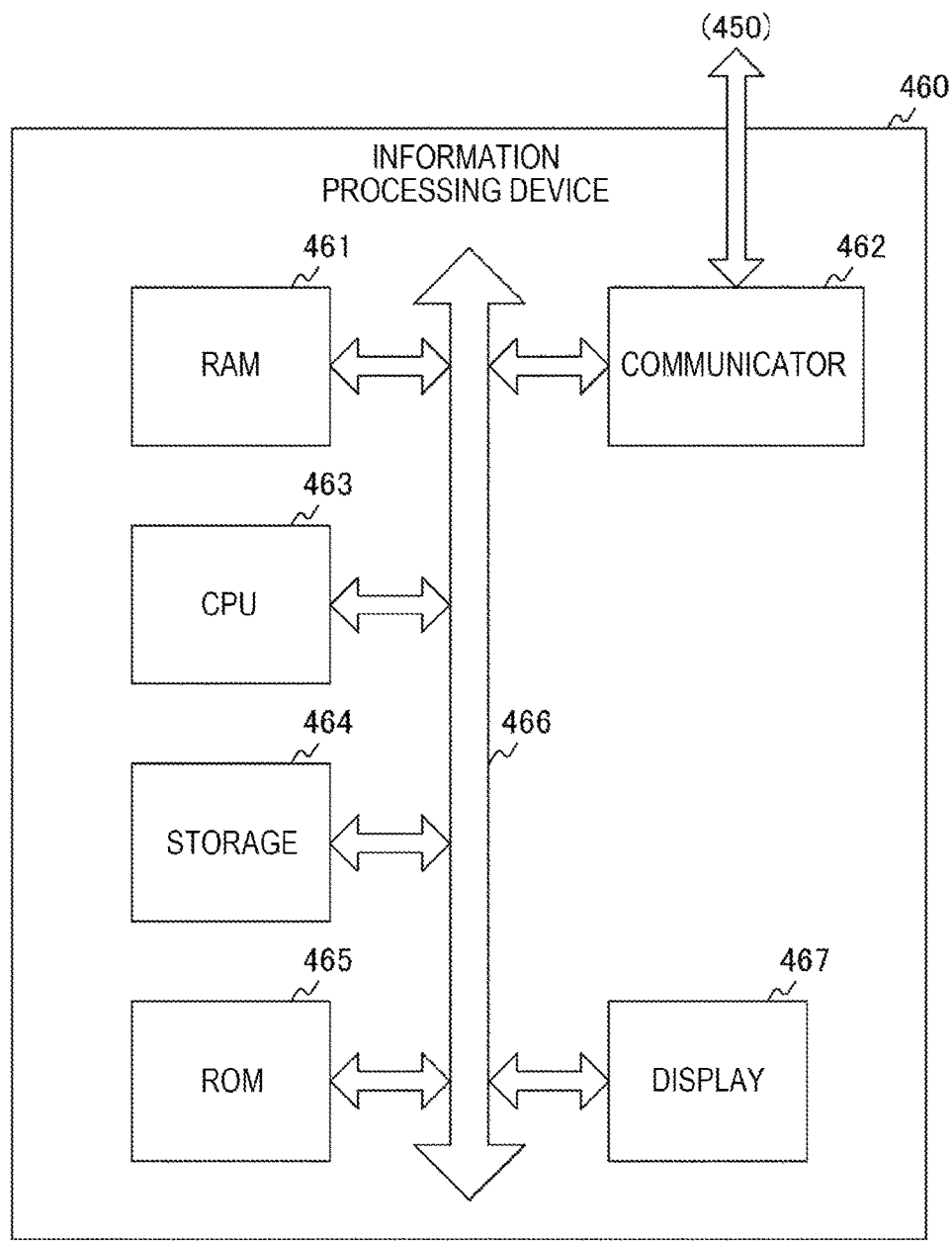
FIG. 8 is a block diagram of one configuration example of an information processing device in the first embodiment of the present technology.

FIG. 8 is a block diagram of one configuration example of the information processing device 460 in the first embodiment. The information processing device 460 includes a random access memory (RAM) 461, a communicator 462, a central processing unit (CPU) 463, and a ROM 465. Moreover, the information processing device 460 includes a bus 466 and a display 467.

The CPU 463 is configured to control the entirety of the information processing device 460. The RAM 461 is used as a working area for temporarily storing a program to be executed by the CPU 463 and data necessary for processing. The ROM 465 is configured to record, e.g., the program to be executed by the CPU 463.

A storage 464 is configured to store predetermined data. For example, the name of the resident and the staff person in charge for each room, the recognition parameters, the database generated by the information processing device 460, and the like are stored in the storage 464. The display 467 is configured to display an operation screen etc. The bus 466 is a common path for exchanging data among the RAM 461, the communicator 462, the CPU 463, and the ROM 465.

The communicator 462 is configured to exchange data with the multifunction ceiling light 100 or the information terminal 440 via the wireless LAN repeater 450 etc. The recognition result, the measurement data, the measurement date and time, notification of main power stop, the main power stop time, etc. are transmitted from the multifunction ceiling light 100 to the communicator 462. Moreover, notification of main power stop, the main power stop time, a recognition result history, etc. are transmitted from the communicator 462 to the information terminal 440.

Note that the timing of transmitting data to the information terminal 440 is set as necessary according to a utilization form of the monitoring system. For example, the information processing device 460 may promptly transfer notification of main power stop, or may transfer notification of main power stop after a certain period has elapsed after main power stop. For example, there may be a case where right after having erroneously turned off the wall switch 410, the user notices erroneous operation and turns on the wall switch 410. Considering this case, the information processing device 460 may transfer notification of main power stop in a case where transmission of the measurement data is not resumed even after the certain period has elapsed after notification of main power stop.

FIG. 9 is a table of one example of data held in the information processing device 460 in the first embodiment. For example, a database with items of "ROOM NUMBER", "RESIDENT", "TIME", "STATE", and "NOTIFICATION DESTINATION TERMINAL ID" is generated and stored in the storage 464 in the information processing device 460.

It is assumed that Mr/Ms. Yamada settles in a room No. 301 and the multifunction ceiling light 100 recognizes that Mr/Ms. Yamada was sleeping on a bed at 12:00. The multifunction ceiling light 100 in the room No. 301 transmits the time of "12:00" and the recognition result of "BED" to the information processing device 460. The information processing device 460 identifies the room number and the resident at the received data source with reference to an Internet protocol (IP) address of the data source. Moreover, the information processing device 460 acquires identification information (ID) regarding the user's information terminal 440 corresponding to the room number.

Then, the information processing device 460 adds, to the database, the data of the room number "301", the resident "YAMADA", the time "12:00", the state "BED", and the notification destination terminal ID "001".

Moreover, it is assumed that Mr/Ms. Sato settles in a room No. 305 and the multifunction ceiling light 100 has detected stop of the main power supply at 12:00. The multifunction ceiling light 100 in the room No. 305 transmits the time of "12:00" and notification of "POWER STOP" to the information processing device 460.

Then, the information processing device 460 adds, to the database, the data of the room number "305", the resident "SATO", the time "12:00", the state "POWER STOP", and the notification destination terminal ID "002". Moreover, the information processing device 460 transfers notification of power stop to the information terminal 440 with the notification destination terminal ID "002".

[Configuration Example of Information Terminal]

Figure 10:
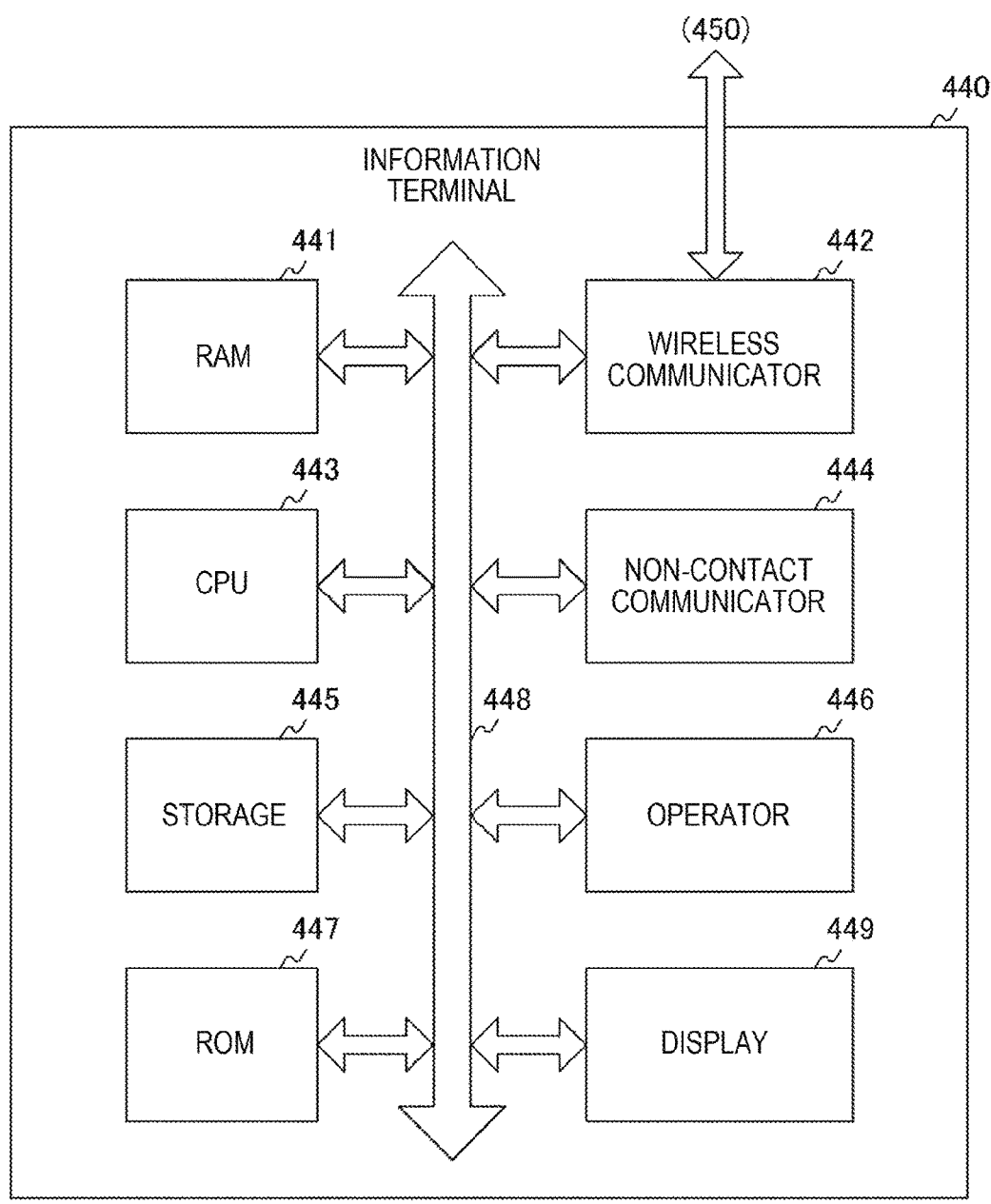
FIG. 10 is a block diagram of one configuration example of an information terminal in the first embodiment of the present technology.

FIG. 10 is a block diagram of one configuration example of the information terminal 440 in the first embodiment. The information terminal 440 includes a RAM 441, a wireless communicator 442, a CPU 443, a non-contact communicator 444, a storage 445, an operator 446, a ROM 447, a bus 448, and a display 449.

The CPU 443 is configured to control the entirety of the information terminal 440. The RAM 441 is used as a working area for temporarily storing a program to be executed by the CPU 443 and data necessary for processing. The ROM 447 is configured to record, e.g., the program to be executed by the CPU 443.

The wireless communicator 442 is configured to perform wireless communication with a device such as the multifunction ceiling light 100. In such wireless communication, communication standards such as Wi-Fi (registered trademark) are used. The non-contact communicator 444 is configured to perform non-contact communication with a device such as the multifunction ceiling light 100. In such non-contact communication, communication standards such as the Bluetooth (registered trademark) are used.

The storage 445 is configured to store predetermined data. The storage 445 stores, for example, data received from the information processing device 460, and the like. The operator 446 is configured to output an operation signal according to user's operation. The display 449 is configured to display data according to control of the CPU 443.

Figure 11:
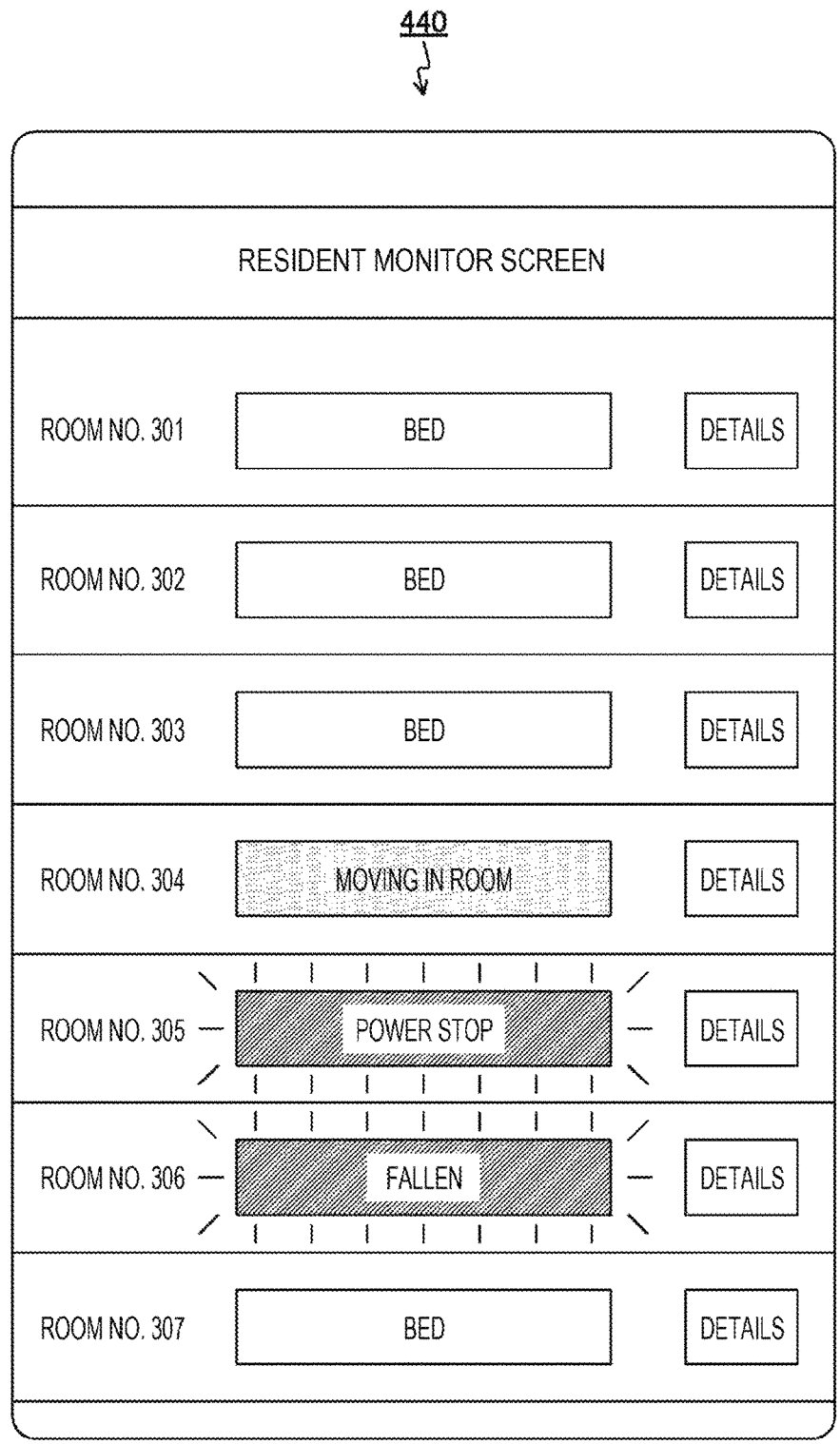
FIG. 11 is a view of one example of a resident monitor screen displayed on the information terminal in the first embodiment of the present technology.

FIG. 11 is a view of one example of a resident monitor screen displayed on the information terminal 440 in the first embodiment. This resident monitor screen is, for example, displayed when the information terminal 440 executes a predetermined application. On the resident monitor screen, the status of each room for which the user of the information terminal 440 is responsible is displayed. Moreover, on the resident monitor screen, data with high importance for the user, such as falling of the resident or power stop, is identified and displayed by blinking or a particular color. Details of the status of the room can be referred to by pressing of a "DETAILS" button by the user.

It is assumed that the rooms for which the user is responsible are rooms No. 301 to 307, the main power supply has been stopped in the room No. 305, and the resident has fallen in the room No. 306. Moreover, suppose that the resident is moving in the room No. 304, and the residents are sleeping on beds in other rooms. In this case, the information terminal 440 identifies and displays "POWER STOP" in association with the room No. 305, and identifies and displays "FALLEN" in association with the room No. 306. Moreover, the information terminal 440 displays "MOVING IN ROOM" in association with the room No. 304, and displays "BED" in association with other rooms.

FIG. 12 is a view of one example of a detailed screen displayed on the information terminal 440 in the first embodiment. The detailed screen is displayed when the "DETAILS" button is pressed on the resident monitor screen. On the detailed screen, the state of the room, warning setting information, a warning history, and an action history are displayed. The warning setting information described herein indicates the type of state to be identified and displayed. Moreover, the warning history indicates the history of the identified and displayed state. The action history indicates the history of action of the resident.

The warning setting information includes, for example, information indicating whether or not each state of "LEAVING BED", "MOVING IN ROOM", "CROUCHING", "FALLEN", "LEAVING ROOM", "TOILET", "SENSOR ABNORMALITY", and "POWER STOP" is to be identified and displayed. Specifically, a checkbox is displayed for each state, and the user checks, as necessary, the checkbox(es) corresponding to the state(s) so that the state(s) can be identified and displayed.

Note that the information terminal 440 notifies the user of the state of power stop by identification and displaying, but may notify the user by audio output or vibration of the information terminal 440.

[Operation Example of Multifunction Unit]

Figure 13:
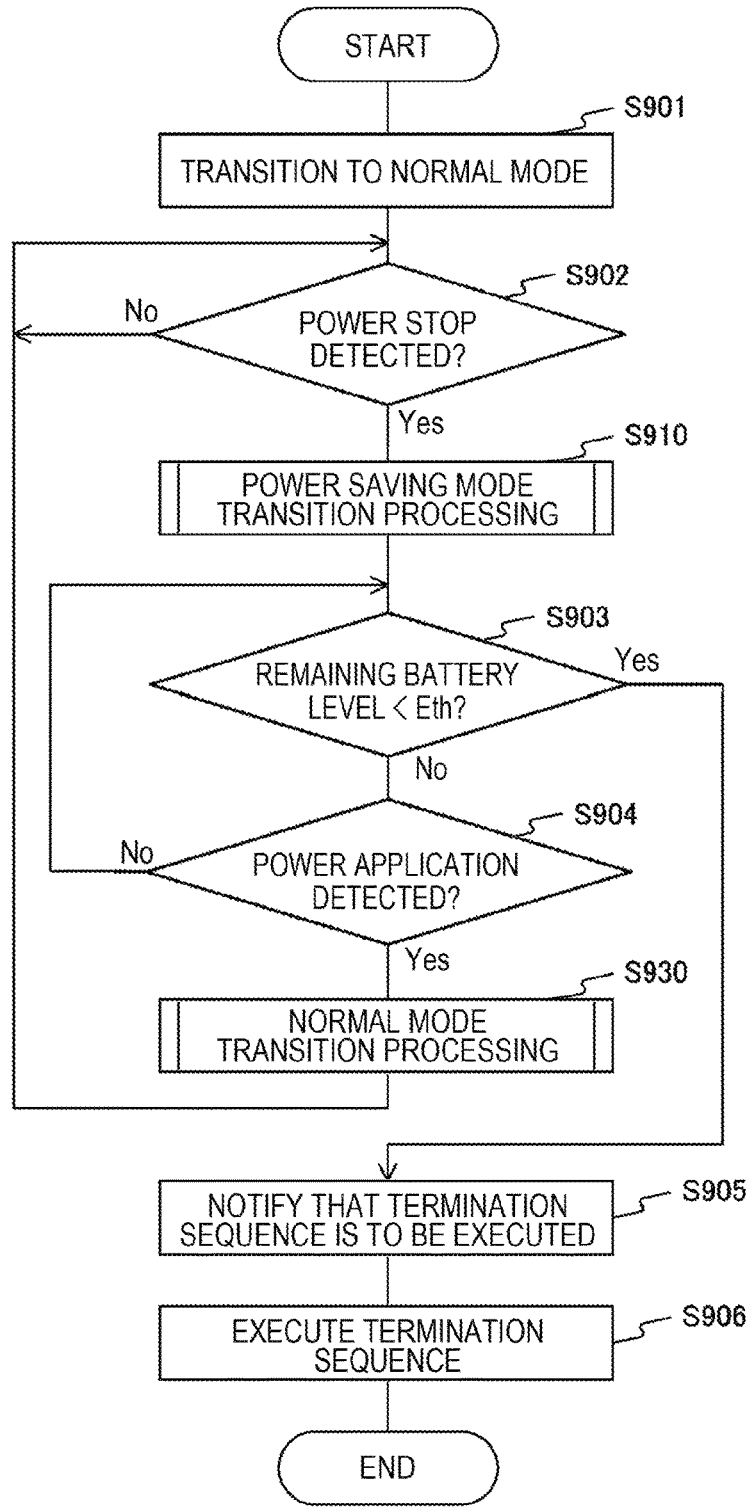
FIG. 13 is a flowchart of one example of operation of the multifunction unit in the first embodiment of the present technology.

FIG. 13 is a flowchart of one example of operation of the multifunction unit 300. Such operation begins when power is applied to the multifunction ceiling light 100, for example. The multifunction unit 300 transitions to the normal mode (step S901). Then, the multifunction unit 300 determines whether or not power stop has been detected (step S902).

In a case where power stop has been detected (step S902: Yes), the multifunction unit 300 executes power saving mode transition processing for transition to the power saving mode (step S910). Then, the multifunction unit 300 determines whether or not the remaining level of the battery 320 is lower than a predetermined threshold Eth (step S903).

In a case where the remaining level of the battery 320 is equal to or higher than the predetermined threshold Eth (step S903: No), the multifunction unit 300 determines whether or not power application has been detected (step S904). In a case where power application has been detected (step S904: Yes), the multifunction unit 300 executes normal mode transition processing for transition to the normal mode (step 5930). On the other hand, in a case where power application is not detected (step S904: No), the multifunction unit 300 repeatedly executes step S903 and subsequent steps thereof.

In a case where power stop is not detected (step S902: No) or after step S930, the multifunction unit 300 repeatedly executes step S902 and subsequent steps thereof.

Moreover, in a case where the remaining level of the battery 320 is lower than the predetermined threshold Eth (step S903: Yes), the multifunction unit 300 notifies the information processing device 460 that a termination sequence is to be executed due to a low remaining battery level (step S905). Then, the multifunction unit 300 executes the termination sequence (step S906), and ends operation.

Figure 14:
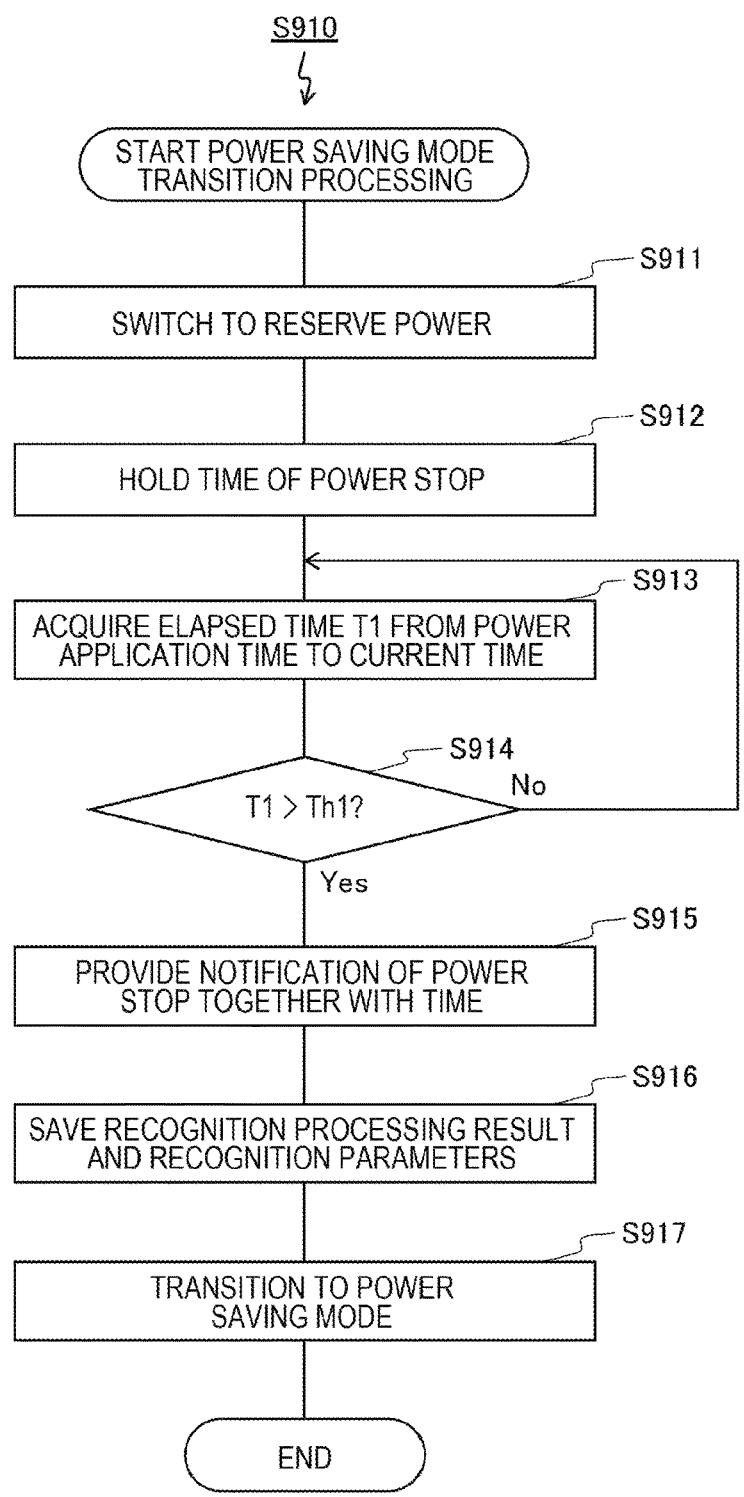
FIG. 14 is a flowchart of one example of power saving mode transition processing in the first embodiment of the present technology.

FIG. 14 is a flowchart of one example of the power saving mode transition processing in the first embodiment. The multifunction unit 300 switches the main power to the reserve power (step S911), and holds the time of power stop (step S912). Then, the multifunction unit 300 acquires an elapsed time T1 from the power application time to a current time (step S913), and determines whether or not the elapsed time T1 is longer than a predetermined time Th1 (step S914).

In a case where the elapsed time T1 is longer than the predetermined time Th1 (step S914: Yes), the multifunction unit 300 notifies, together with the power stop time, the information processing device 460 of power stop (step S915). Then, the multifunction unit 300 saves the recognition processing result, the recognition parameters, etc. right before power stop (step S916). The power supply to the sensor 351 etc. is stopped, and transition to the power saving mode is made (step S917). After step S917, the multifunction unit 300 ends the power saving mode transition processing.

In a case where the elapsed time T1 is equal to or shorter than the predetermined time Th1 (step S914: No), the multifunction unit 300 returns to before step S913, and re-acquires the elapsed time from the power application time to the current time.

As described above, it is determined whether or not the elapsed time T1 is longer than the predetermined time Th1. Thus, continuous notification of power stop can be prevented in a case where the user repeats ON/OFF operation of the wall switch 410 within a short period of time. As described above, continuous notification of power stop is prevented so that a user's feeling of botheration can be reduced. Moreover, useless data transmission is reduced so that a communication volume can be reduced.

Figure 15:
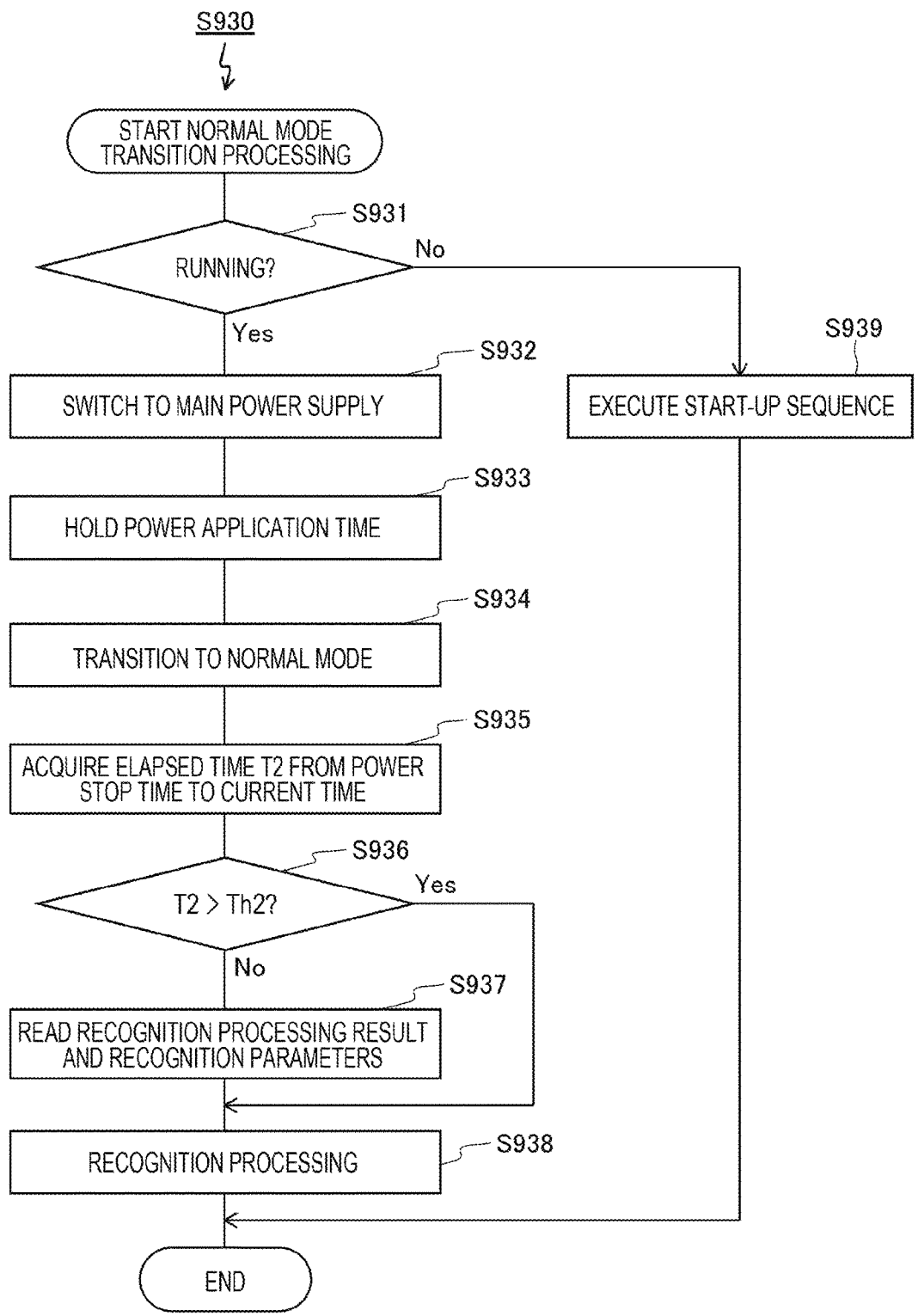
FIG. 15 is a flowchart of one example of normal mode transition processing in the first embodiment of the present technology.

FIG. 15 is a flowchart of one example of the normal mode transition processing in the first embodiment. The multifunction unit 300 determines whether or not a start-up sequence has been executed (in other words, the start-up sequence is running) (step S931). In the case of running the sequence (step S931: Yes), the multifunction unit 300 makes switching to the main power (step S932), holds the power application time (step S933), and transitions to the normal mode (step S934). Then, the multifunction unit 300 acquires an elapsed time T2 from the power stop time to the current time (step S935), and determines whether or not the elapsed time T2 is longer than a predetermined time Th2 (step S936).

In a case where the elapsed time T2 is equal to or shorter than the predetermined time Th2 (step S936: No), the multifunction unit 300 reads the previously-saved recognition processing result and recognition parameters (step S937). On the other hand, in a case where the elapsed time T2 is longer than the predetermined time Th2 (step S936: Yes) or after step S937, the multifunction unit 300 newly executes the recognition processing (step S938).

As described above, it is determined whether or not the elapsed time T2 is longer than the predetermined time Th2. In this manner, the previous recognition processing result can be directly used to execute the recognition processing at high speed in a case where the user repeats ON/OFF operation of the wall switch 410 within a short period of time.

In the case of not running the sequence (step S931: No), the multifunction unit 300 executes the start-up sequence (step S939). After step S938 or S939, the multifunction unit 300 ends the normal mode transition processing.

[Operation Example of Information Processing Device]

Figure 16:
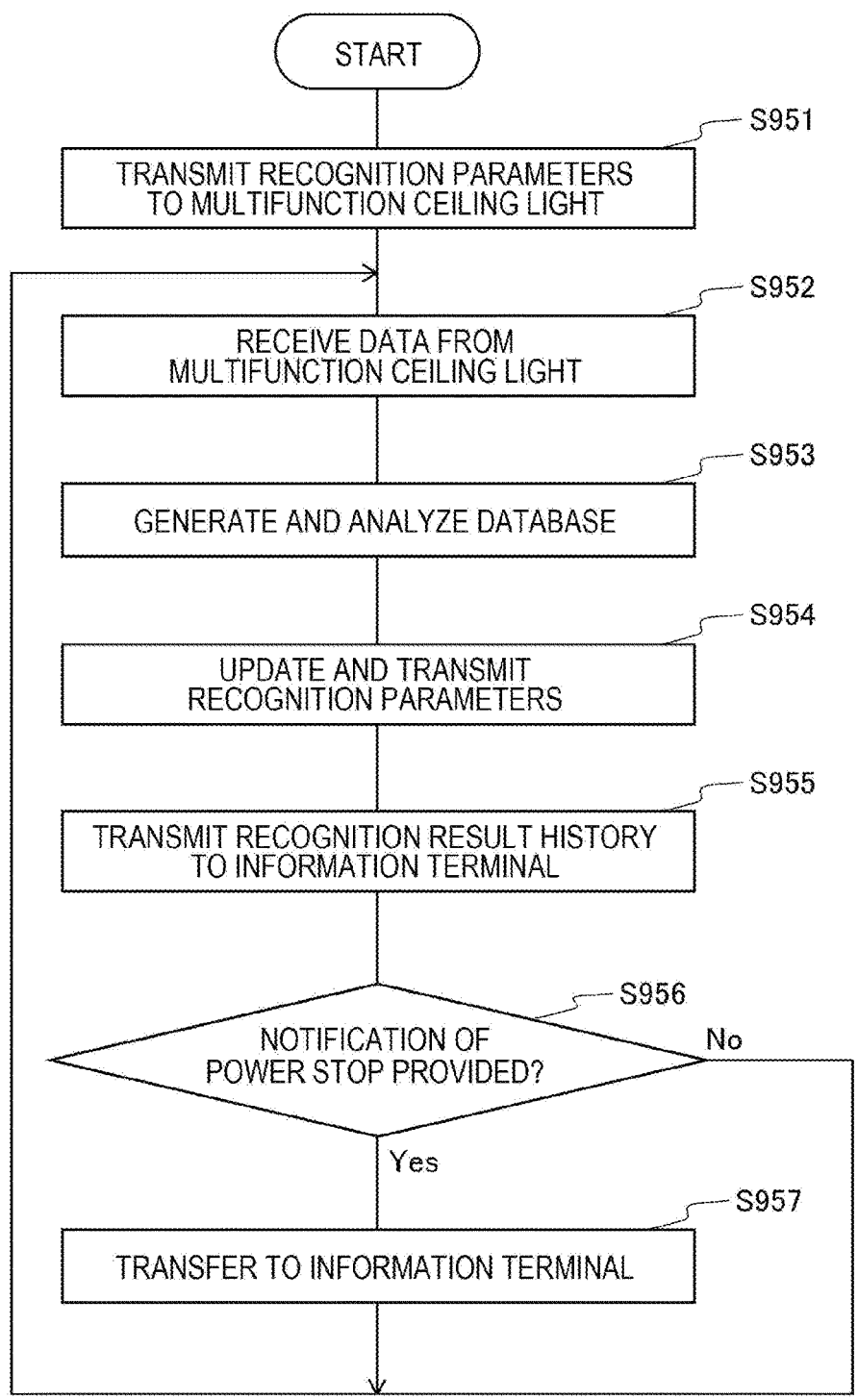
FIG. 16 is a flowchart of one example of operation of the information processing device in the first embodiment of the present technology.

FIG. 16 is a flowchart of one example of operation of the information processing device 460 in the first embodiment. Such operation begins when a predetermined application is executed in the information processing device 460, for example. The information processing device 460 transmits the recognition parameters to each of the multifunction ceiling lights 100 in the monitoring system (step S951). Moreover, the information processing device 460 receives data such as the recognition result from the multifunction ceiling light 100 (step S952), and performs generation of the database and analysis of data (step S953). By such data analysis, optimization of the recognition parameters is performed, for example. For example, for a resident with a high frequency of falling, the threshold to be compared with the degree of correlation is adjusted such that falling is recognized even when the degree of correlation with the waveform pattern for falling is low.

Then, the information processing device 460 updates the recognition parameters on the basis of an analysis result, and transmits the updated parameters to the multifunction ceiling light 100 (step S954). Moreover, the information processing device 460 transmits the history of the recognition result to the information terminal 440 (step S955). Transmission of the history of the recognition result as described herein may be performed regularly, or may be performed according to a request from the information terminal 440.

Subsequently, the information processing device 460 determines whether or not notification of power stop has been provided by the multifunction ceiling light 100 (step S956). In a case where notification of power stop has been provided (step S956: Yes), the information processing device 460 transfers notification to the information terminal 440 corresponding to the room as a notification source (step S957). In a case where notification of power stop is not provided (step S956: No) or after step S957, the information processing device 460 repeats step S952 and subsequent steps thereof.

As described above, according to the first embodiment of the present technology, the multifunction unit 300 transmits, when detecting stop of the main power supply, the detection result by means of the reserve power of the battery 320. Thus, notification of stop of the main power supply can be provided to the user as the transmission destination. When the user having received notification promptly turns on the wall switch 410 to resume the main power supply, a situation where the sensor 351 is stopped across a long period of time can be prevented, and the influence of erroneous operation can be reduced.

2. Second Embodiment

In the above-described first embodiment, the multifunction unit 300 switches the main power to the reserve power by the switch 330, but there is a probability that a failure is caused due to a long switching time from stop of the main power supply to switching to the reserve power. For example, in a case where the switching speed of the switch 330 or the operation speed of the power stop detection circuit 315 is slow, the switching time might be long. In the electronic equipment controller 340 described herein, a capacitor is mounted to avoid influence even in instantaneous blackout. However, when the switching time is longer than a blackout time which can be handled by the capacitor, a failure such as file damage or data loss might be caused due to temporal stop of the power supply to a subsequent circuit of the capacitor. A multifunction unit 300 of a second embodiment is different from that of the first embodiment in that an auxiliary battery configured to supply auxiliary power upon power switching is provided for reducing occurrence of a failure upon power switching.

Figure 17:
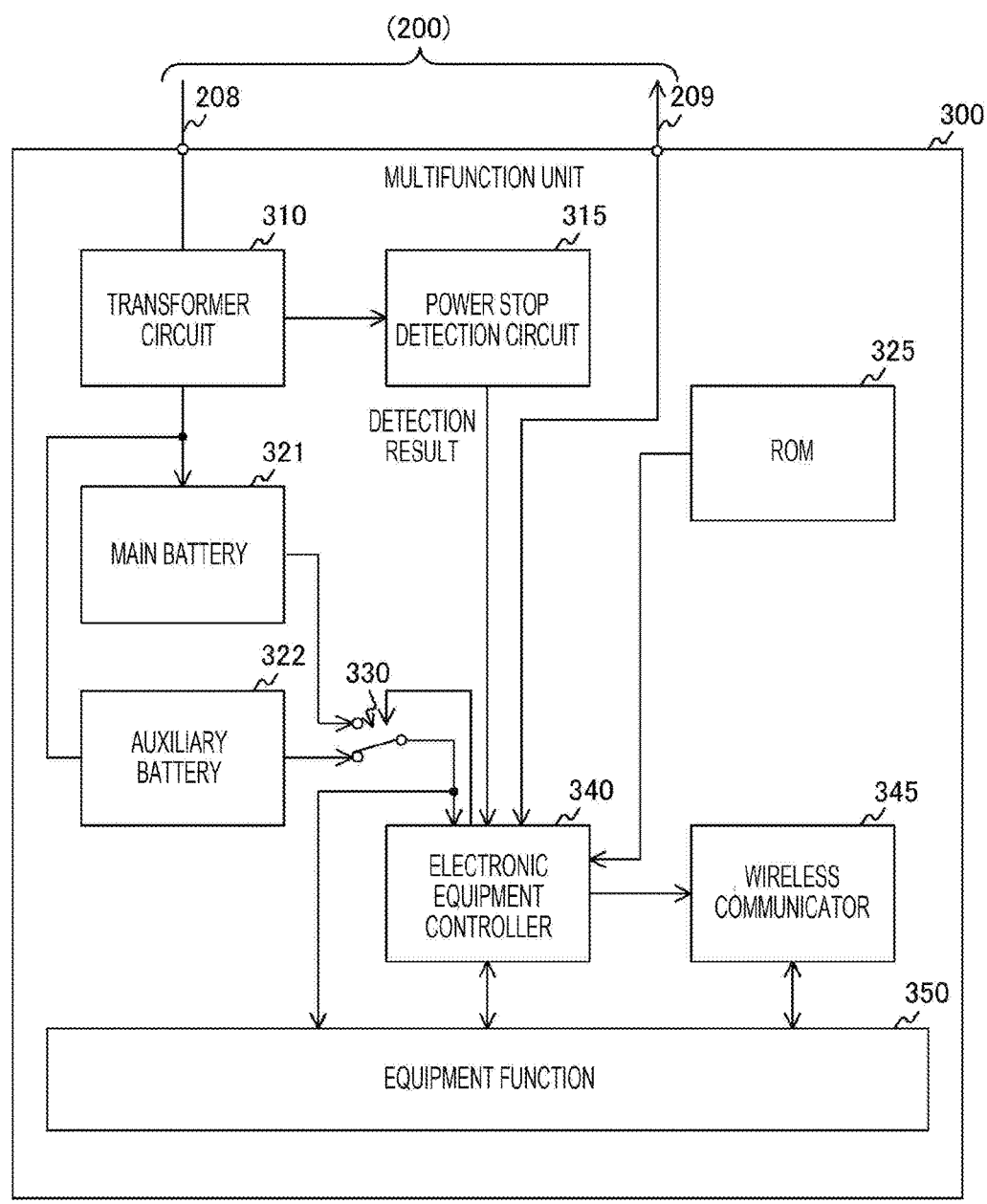
FIG. 17 is a block diagram of one configuration example of a multifunction unit in a second embodiment of the present technology.

FIG. 17 is a block diagram of one configuration example of the multifunction unit 300 in the second embodiment. The multifunction unit 300 of the second embodiment is different from that of the first embodiment in that a main battery 321 and an auxiliary battery 322 are provided instead of the battery 320. The charging capacity of the main battery 321 is greater than that of the auxiliary battery 322.

A transformer circuit 310 of the second embodiment supplies DC voltage to the main battery 321 and the auxiliary battery 322. Moreover, a switch 330 selects any of reserve power from the main battery 321 and power from the auxiliary battery 322, thereby supplying the selected power. When main power is applied, an electronic equipment controller 340 controls the switch 330 to switch a power source to the auxiliary battery 322.

On the other hand, when main power supply is stopped, the electronic equipment controller 340 controls the switch 330 to make switching to the main battery 321. Then, in a switching time from stop of the main power to switching to the reserve power, the auxiliary battery 322 supplies, as the auxiliary power, charged power to the switch 330.

As described above, according to the second embodiment of the present technology, the auxiliary battery 322 supplies the auxiliary power until switching from the main power to the reserve power, and therefore, the switch 330 can continuously supply the power. With this configuration, occurrence of the failure due to power switching can be reduced.

3. Third Embodiment

In the above-described second embodiment, the auxiliary battery 322 is provided to reduce occurrence of the failure, but there is a probability that the size of the multifunction unit 300, the number of components of the multifunction unit 300, and the cost of the multifunction unit 300 are increased by the auxiliary battery 322. A multifunction unit 300 of a third embodiment is different from that of the second embodiment in that occurrence of a failure is reduced by continuous charged power supply from a battery without providing an auxiliary battery 322.

Figure 18:
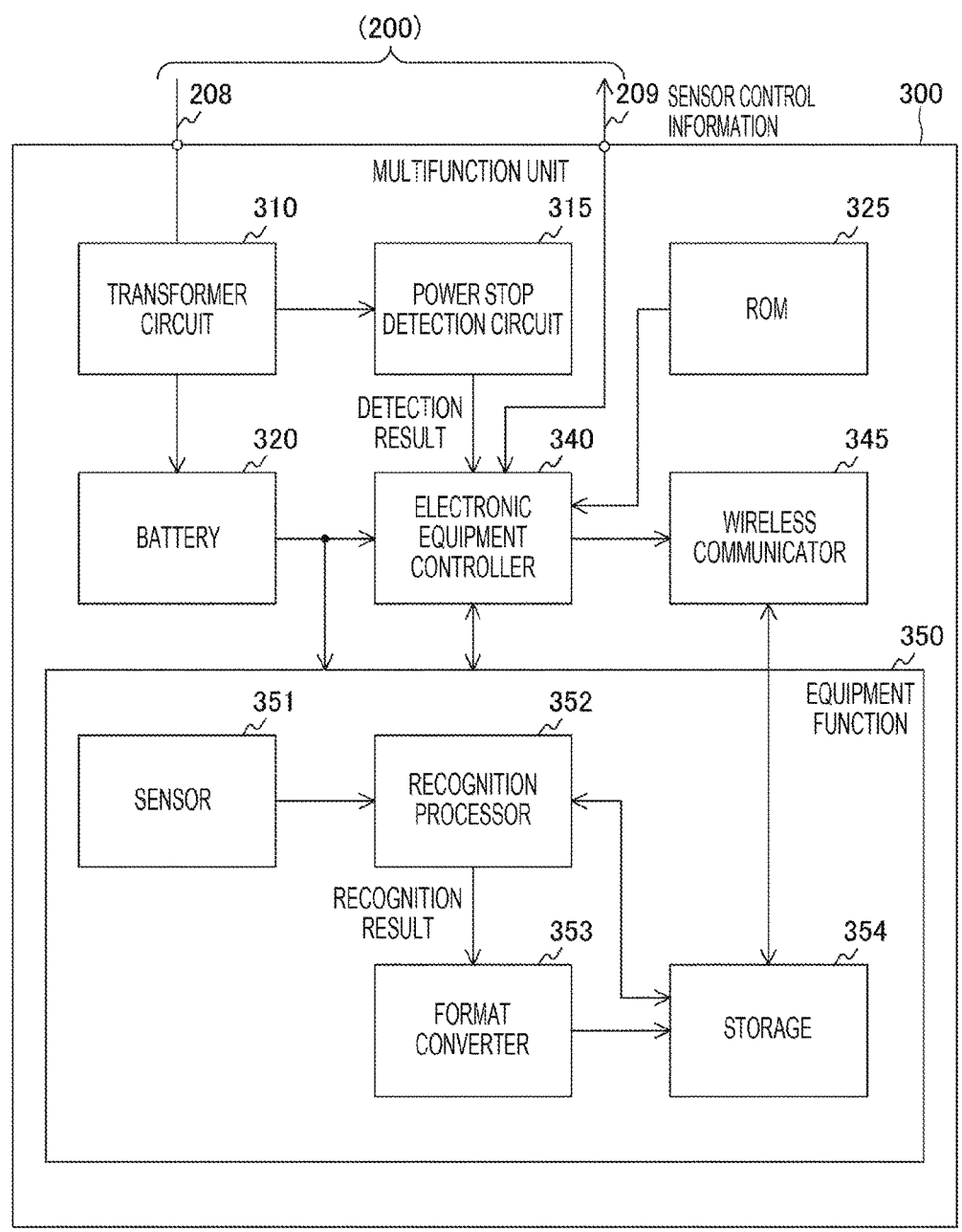
FIG. 18 is a block diagram of one configuration example of a multifunction unit in a third embodiment of the present technology.

FIG. 18 is a block diagram of one configuration example of the multifunction unit 300 in the third embodiment. The multifunction unit 300 of the third embodiment is different from that of the second embodiment in that a battery 320 is provided instead of the main battery 321, the auxiliary battery 322, and the switch 330.

The battery 320 of the third embodiment is configured to continuously supply charged power to an electronic equipment controller 340 and an equipment function 350 before and after power switching. In the first embodiment described herein, in the case of supplying the main power, the battery 320 only performs charging, and does not perform discharging.

On the other hand, in the third embodiment, in the case of not stopping main power, the battery 320 is charged with the main power, and supplies the charged power to the electronic equipment controller 340 etc. (i.e., discharges). Moreover, in the case of stopping the main power, the battery 320 supplies the charged power as reserve power.

As described above, according to the third embodiment of the present technology, the battery 320 continuously supplies the charged power, and therefore, occurrence of an injury due to blackout can be reduced without providing the auxiliary battery 322 and the switch 330.

4. Fourth Embodiment

In the above-described first embodiment, the multifunction unit 300 stops the sensor 351 upon switching to the reserve power. However, when an accident such as falling of the resident occurs during stop of the sensor 351, there is a probability that the user cannot grasp such an accident and a response to the accident is delayed. For this reason, the sensor 351 preferably continuously performs measurement even after switching to the reserve power. A multifunction unit 300 of a fourth embodiment is different from that of the first embodiment in that a measurement interval of a sensor 351 is controlled for continuing measurement by the sensor 351 even after switching to the sensor 351.

Figure 19:
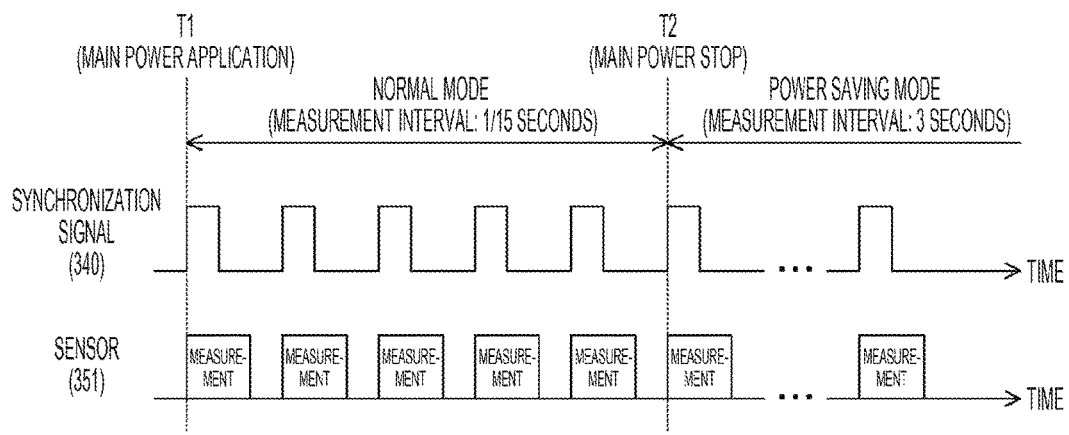
FIG. 19 is a timing chart of one example of operation of a multifunction unit in a fourth embodiment of the present technology.

FIG. 19 is a timing chart of one example of operation of the multifunction unit 300 in the fourth embodiment. An electronic equipment controller 340 supplies a synchronization signal with a certain frequency to the sensor 351, and the sensor 351 performs measurement in synchronization with the synchronization signal. When main power is applied at timing T1, the electronic equipment controller 340 transitions to a normal mode. In this normal mode, an equipment controller 350 causes, according to the synchronization signal with the certain frequency, the sensor 351 to perform measurement in every $\frac{1}{15}$ seconds, for example.

On the other hand, when main power supply is stopped at timing T2, the electronic equipment controller 340 transitions to a power saving mode. In this power saving mode, the sensor 351 in the equipment controller 350 continues measurement by means of reserve power. Moreover, the electronic equipment controller 340 lowers the frequency of the synchronization signal, and causes the sensor 351 to perform measurement in every three seconds, for example. As described above, a measurement interval is extended in the power saving mode so that power consumption of the sensor 351 can be reduced.

Note that the electronic equipment controller 340 controls the measurement interval, but may control other parameters than the measurement interval as long as power consumption of the sensor 351 can be reduced. For example, a case where an acoustic sensor configured so that a sampling frequency or a quantization bit rate can be changed is used as the sensor 351 is assumed. In this case, the electronic equipment controller 340 may lower, in the power saving mode, the sampling frequency, or may decrease the quantization bit rate.

Moreover, a case where an image sensor configured so that the resolution of a captured image can be changed is used as the sensor 351 is assumed. In this case, the electronic equipment controller 340 may lower the resolution in the power saving mode.

As described above, according to the fourth embodiment of the present technology, the multifunction unit 300 extends the measurement interval without stopping the sensor 351 after stop of main power supply, and therefore, measurement by the sensor 351 can be continuously performed.

5. Fifth Embodiment

In the above-described fourth embodiment, the multifunction unit 300 extends the measurement interval of the sensor 351 after stop of the main power supply, but the probability that the multifunction unit 300 overlooks an accident such as falling due to the extended measurement interval is increased. A multifunction unit 300 of a fifth embodiment is different from that of the fourth embodiment in that extension of a measurement interval is suppressed.

Figure 20:
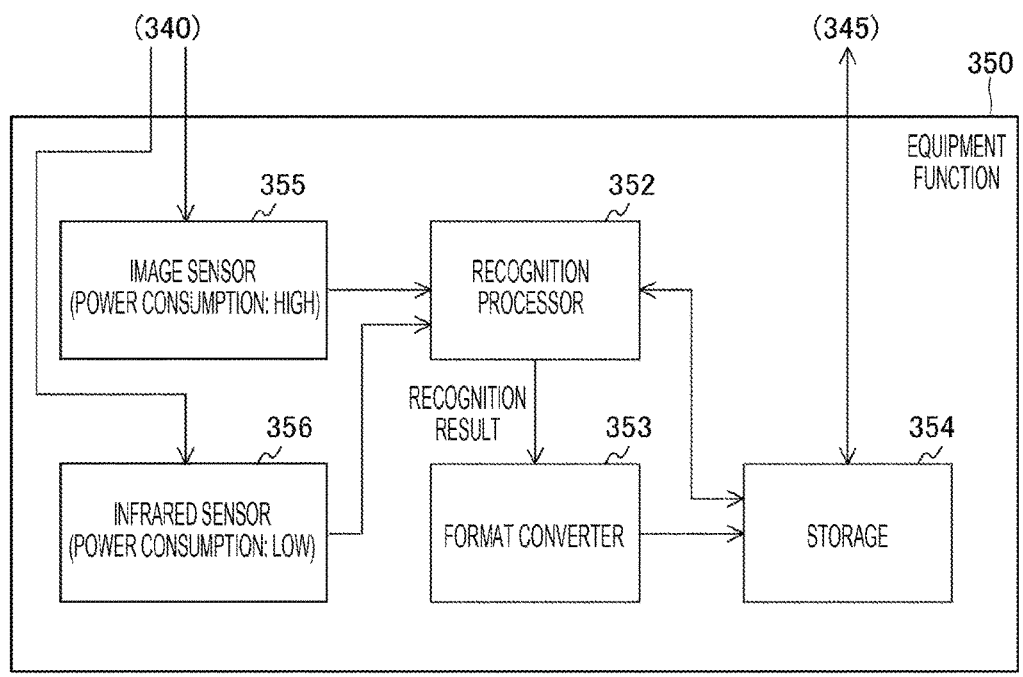
FIG. 20 is a block diagram of one configuration example of an equipment function in a fifth embodiment of the present technology.

FIG. 20 is a block diagram of one configuration example of an equipment function 350 in the fifth embodiment. The equipment function 350 of the fifth embodiment is different from that of the fourth embodiment in that an image sensor 355 and an infrared sensor 356 are provided instead of the sensor 351.

The image sensor 355 is configured to capture image data at a certain measurement interval. The image sensor 355 supplies the captured image data to a recognition processor 352.

The infrared sensor 356 is configured to receive, at a certain interval, reflected light of infrared light projected from an infrared projector (not shown). The infrared sensor 356 supplies received light data to the recognition processor 352.

Generally, power consumption of the infrared sensor 356 is smaller than that of the image sensor 355. Thus, in a normal mode, an electronic equipment controller 340 stops the infrared sensor 356, and drives the image sensor 355. On the other hand, in a power saving mode, the electronic equipment controller 340 drives the infrared sensor 356, and stops the image sensor 355.

The measurement intervals of the image sensor 355 and the infrared sensor 356 are separately set, but power consumption of the infrared sensor 356 is smaller as described above. Thus, the necessity of extending the measurement interval of the infrared sensor 356 is low. Thus, by switching of the sensor, extension of the measurement interval can be suppressed while power consumption can be reduced.

Note that the image sensor 355 and the infrared sensor 356 are provided for switching, but other combinations than this combination maybe employed as long the sensors targeted for switching are different from each other in power consumption. For example, switching may be made between an image sensor and an acoustic sensor.

Moreover, the type of sensor to be driven is switched, but the number of sensors to be driven may be changed upon mode switching. For example, the electronic equipment controller 340 may drive both of the image sensor 355 and the infrared sensor 356 in the normal mode, and may drive only one of the image sensor 355 or the infrared sensor 356 in the power saving mode.

As described above, according to the fifth embodiment of the present technology, the multifunction unit 300 makes switching from the image sensor 355 to the infrared sensor 356 when main power supply is stopped. Thus, extension of the measurement interval can be suppressed while power consumption can be reduced.

Note that the above-described embodiments have described examples for embodying the present technology, and matters in the embodiments and matters specifying the invention in the claims are in a correspondence relationship. Similarly, the matters specifying the invention in the claims and matters having the same names as those of the invention specifying matters in the embodiments of the present technology are in a correspondence relationship. Note that the present technology is not limited to the embodiments, and for embodying, various modifications can be made to the embodiments without departing from the gist of the present technology.

Moreover, the processing steps described in the above-described embodiments may be taken as a method including a series of these steps, or may be taken as a program for causing a computer to execute a series of these steps and a storage medium configured to store the program. For example, a compact disc (CD), a minidisc (MD), a digital versatile disc (DVD), a memory card, a Blu-ray (registered trademark) disc, and the like can be used as the storage medium.

Note that advantageous effects described in the present specification have been set forth as examples, and are not limited to above. Moreover, other advantageous effects may be provided.

Note that the present technology may employ the following configurations.

(1) A monitoring system including:
lighting equipment to be turned on by means of main power;
a remote control device configured to turn off the lighting equipment;
a battery configured to supply reserve power;
a sensor configured to perform predetermined measurement by means of the main power;
a detector configured to detect whether or not supply of the main power has been stopped by operation of a predetermined switch, and generate a detection result; and
a communicator configured to transmit the detection result by means of the reserve power in a case where the supply of the main power has been stopped.

(2) The monitoring system according to (1), further including:
a selector configured to select any of the main power and the reserve power on the basis of the detection result to supply the main power or the reserve power to the communicator.

(3) The monitoring system according to (2), further including:
an auxiliary battery configured to supply auxiliary power to the selector until the main power is switched to the reserve power.

(4) The monitoring system according to (1), in which
the battery is charged with the main power to supply charged power to the communicator in a case where the supply of the main power is not stopped, and supplies, as the reserve power, the charged power to the communicator in a case where the supply of the main power has been stopped.

(5) The monitoring system according to any of (1) to (4), further including:
a controller configured to lower power consumption of the sensor in a case where the supply of the main power has been stopped.

(6) The monitoring system according to (5), in which
the sensor includes two sensors different from each other in power consumption, and
the controller drives one, whose power consumption is higher, of the two sensors in a case where the supply of the main power is not stopped, and drives one, whose power consumption is lower, of the two sensors in a case where the supply of the main power has been stopped.

(7) The monitoring system according to any of (1) to (6), in which
the communicator determines, in a case where the supply of the main power has been stopped, whether or not an elapsed time from start of the supply of the main power to a current time is longer than a predetermined time, and transmits the detection result when the elapsed time is longer than the predetermined time.

(8) The monitoring system according to any of (1) to (7), further including:
an information terminal configured to receive and display the transmitted detection result.

(9) Electronic equipment including:
a battery configured to supply reserve power;
a sensor configured to perform predetermined measurement by means of main power supplied to lighting equipment;
a detector configured to detect whether or not supply of the main power has been stopped by operation of a predetermined switch, and generate a detection result; and
a communicator configured to transmit the detection result by means of the reserve power in a case where the supply of the main power has been stopped.

(10) A monitoring system control method including:
a lighting step of turning on lighting equipment by means of main power;
a measurement step of performing predetermined measurement by a sensor by means of the main power;
a detection step of detecting whether or not supply of the main power has been stopped by operation of a predetermined switch, and generating a detection result; and
a communication step of transmitting the detection result by means of reserve power supplied from a battery in a case where the supply of the main power has been stopped.

REFERENCE SIGNS LIST

100 Multifunction ceiling light
200 Ceiling light
210 Power supply circuit
215 Light emission controller
220 Light emitter
225, 310 Transformer circuit
230, 345, 442 Wireless communicator
235 Lighting equipment controller
240, 444 Non-contact communicator
245, 330 Switch
250 Infrared communicator
255 Attachment sensor
300 Multifunction unit
315 Power stop detection circuit
320 Battery
321 Main battery
322 Auxiliary battery
325, 447, 465 ROM
340 Electronic equipment controller
350 Equipment function
351 Sensor
352 Recognition processor
353 Format converter
354, 445, 464 Storage
355 Image sensor
356 Infrared sensor
410 Wall switch
420 Remote control device
430, 450 Wireless LAN repeater
440 Information terminal
441, 461 RAM
443, 463 CPU
446 Operator
448, 466 Bus
449, 467 Display
460 Information processing device
462 Communicator
500 AC power supply

The invention claimed is:

1. A monitoring system comprising:
lighting equipment to be turned on by means of main power;
a remote control device configured to turn off the lighting equipment;
a battery configured to supply reserve power;
a sensor configured to perform predetermined measurement by means of the main power;

a detector configured to detect whether or not supply of the main power has been stopped by operation of a predetermined switch, and generate a detection result; and a communicator configured to transmit the detection result by means of the reserve power in a case where the supply of the main power has been stopped.

2. The monitoring system according to claim 1, further comprising:

a selector configured to select any of the main power and the reserve power on the basis of the detection result to supply the main power or the reserve power to the communicator.

3. The monitoring system according to claim 2, further comprising:

an auxiliary battery configured to supply auxiliary power to the selector until the main power is switched to the reserve power.

4. The monitoring system according to claim 1, wherein the battery is charged with the main power to supply charged power to the communicator in a case where the supply of the main power is not stopped, and supplies, as the reserve power, the charged power to the communicator in a case where the supply of the main power has been stopped.

5. The monitoring system according to claim 1, further comprising:

a controller configured to lower power consumption of the sensor in a case where the supply of the main power has been stopped.

6. The monitoring system according to claim 5, wherein the sensor includes two sensors different from each other in power consumption, and the controller drives one, whose power consumption is higher, of the two sensors in a case where the supply of the main power is not stopped, and drives one, whose power consumption is lower, of the two sensors in a case where the supply of the main power has been stopped.

7. The monitoring system according to claim 1, wherein the communicator determines, in a case where the supply of the main power has been stopped, whether or not an elapsed time from start of the supply of the main power to a current time is longer than a predetermined time, and transmits the detection result when the elapsed time is longer than the predetermined time.

8. The monitoring system according to claim 1, further comprising:

an information terminal configured to receive and display the transmitted detection result.

9. Electronic equipment comprising:

a battery configured to supply reserve power;

a sensor configured to perform predetermined measurement by means of main power supplied to lighting equipment;

a detector configured to detect whether or not supply of the main power has been stopped by operation of a predetermined switch, and generate a detection result; and a communicator configured to transmit the detection result by means of the reserve power in a case where the supply of the main power has been stopped.

10. A monitoring system control method comprising:

a lighting step of turning on lighting equipment by means of main power;

a measurement step of performing predetermined measurement by a sensor by means of the main power;

a detection step of detecting whether or not supply of the main power has been stopped by operation of a predetermined switch, and generating a detection result; and a communication step of transmitting the detection result by means of reserve power supplied from a battery in a case where the supply of the main power has been stopped.

* * * * *